(12) United States Patent
Agboatwalla et al.

(10) Patent No.: US 11,016,634 B2
(45) Date of Patent: May 25, 2021

(54) REFRIGERATOR STORAGE SYSTEM HAVING A DISPLAY

(71) Applicant: Samsung Electronics Co., Ltd., Suwon-Si (KR)

(72) Inventors: Adnan Agboatwalla, Mountain View, CA (US); Garret Miller, Mountain View, CA (US); James Stanley, Mountain View, CA (US); Andy Wu, Mountain View, CA (US); Robert Mori, Mountain View, CA (US); Kristen Kator, Mountain View, CA (US); Krisela Rivera, Mountain View, CA (US); Peter Santos, Mountain View, CA (US); Yuna S Garten, Mountain View, CA (US); Wei Si, Mountain View, CA (US); Scott Ysebert, Mountain View, CA (US); Patrick Fiori, Mountain View, CA (US); Han Min Lee, Mountain View, CA (US); Eun Jae Lee, Mountain View, CA (US); Youngsun Shin, Mountain View, CA (US); Misu Jung, Mountain View, CA (US); Yoolim Baek, Mountain View, CA (US); So Woon Lee, Mountain View, CA (US); Haeri Lee, Mountain View, CA (US); Jiyoung Woo, Mountain View, CA (US); Sora Kim, Mountain View, CA (US); Robert Thomas, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 295 days.

(21) Appl. No.: 15/656,649

(22) Filed: Jul. 21, 2017

(65) Prior Publication Data
US 2018/0059881 A1    Mar. 1, 2018

Related U.S. Application Data

(60) Provisional application No. 62/382,702, filed on Sep. 1, 2016.

(51) Int. Cl.
*G06F 3/0482* (2013.01)
*G06F 3/0481* (2013.01)
(Continued)

(52) U.S. Cl.
CPC ........ *G06F 3/0482* (2013.01); *G06F 3/04817* (2013.01); *G06F 3/04883* (2013.01);
(Continued)

(58) Field of Classification Search
CPC ............... G06F 3/0482; G06F 3/04817; G06F 3/04883; G06F 3/0483; F25D 29/00;
(Continued)

(56) References Cited

U.S. PATENT DOCUMENTS

| 6,393,848 B2 * | 5/2002 | Roh | F25D 29/00 236/51 |
| 6,549,818 B1 * | 4/2003 | Ali | H05B 6/688 700/90 |

(Continued)

FOREIGN PATENT DOCUMENTS

| EP | 2843336 A1 | 3/2015 |
| EP | 2982916 A1 | 2/2016 |

(Continued)

OTHER PUBLICATIONS

How to Quickly Disable Touch Screen Input in Windows 10/8.1, Jun. 10, 2014.
(Continued)

*Primary Examiner* — Haoshian Shih
*Assistant Examiner* — Alvaro R Calderon, IV
(74) *Attorney, Agent, or Firm* — John J. King

(57) ABSTRACT

A refrigerator storage system is described. The refrigerator storage system comprises a display having a home screen and a processor coupled to the display. The processor is configured to display at least one widget that provides an operation on the display, wherein the at least one widget comprises an interface portion providing direct access to a
(Continued)

feature of the widget, wherein the direct access to the feature of the widget is provided from the home screen.

26 Claims, 32 Drawing Sheets

(51) Int. Cl.
  *G06F 3/0488* (2013.01)
  *G06F 3/0483* (2013.01)
(52) U.S. Cl.
  CPC .... *F25D 2400/361* (2013.01); *F25D 2600/06* (2013.01); *F25D 2700/04* (2013.01); *F25D 2700/06* (2013.01); *G06F 3/0483* (2013.01)
(58) Field of Classification Search
  CPC ........... F25D 2700/06; F25D 2400/361; F25D 2700/04; F25D 2600/06
  See application file for complete search history.

(56) References Cited

U.S. PATENT DOCUMENTS

| | | | |
|---|---|---|---|
| 8,040,666 B2 | 10/2011 | McCoy | |
| 8,189,855 B2* | 5/2012 | Opalach | G06Q 10/087 382/100 |
| 8,214,079 B2* | 7/2012 | Lee | B25J 9/1602 700/245 |
| 8,371,135 B2 | 2/2013 | Lee | |
| 9,361,011 B1* | 6/2016 | Burns | G06F 3/14 |
| 9,449,208 B2 | 9/2016 | Luk et al. | |
| 10,032,192 B2* | 7/2018 | Tinsman | H04N 21/2353 |
| 2001/0010516 A1* | 8/2001 | Roh | F25D 29/00 345/169 |
| 2002/0178066 A1* | 11/2002 | Roh | G06Q 20/203 705/22 |
| 2003/0103023 A1* | 6/2003 | Ootsuka | G09G 3/3629 345/87 |
| 2006/0174641 A1* | 8/2006 | Liu | F25D 29/00 62/246 |
| 2006/0256132 A1* | 11/2006 | Shin | F25D 29/00 345/619 |
| 2007/0152076 A1* | 7/2007 | Chiang | F25D 29/00 236/94 |
| 2008/0114844 A1* | 5/2008 | Sanchez | H04L 67/1095 709/206 |
| 2008/0195944 A1* | 8/2008 | Lee | F25D 29/00 715/706 |
| 2008/0295033 A1* | 11/2008 | Lee | F25D 23/126 715/840 |
| 2009/0282859 A1* | 11/2009 | Glielmo | F25D 29/00 62/440 |
| 2010/0030578 A1* | 2/2010 | Siddique | G06Q 10/0637 705/3 |
| 2010/0079498 A1* | 4/2010 | Zaman | G06F 3/04883 345/661 |
| 2010/0283573 A1* | 11/2010 | Yum | F25D 29/00 340/3.1 |
| 2012/0217254 A1* | 8/2012 | Cho | F25D 29/00 220/592.02 |
| 2012/0260683 A1* | 10/2012 | Cheon | F25D 29/00 62/125 |
| 2012/0265348 A1* | 10/2012 | Kim | F25D 17/042 700/275 |
| 2012/0316984 A1* | 12/2012 | Glassman | G06Q 10/06 705/26.7 |
| 2013/0067375 A1* | 3/2013 | Kim | F25D 29/00 715/769 |
| 2013/0076488 A1* | 3/2013 | Oh | F25D 29/00 340/6.1 |
| 2013/0097543 A1* | 4/2013 | Su | G06F 3/04842 715/770 |
| 2013/0191243 A1* | 7/2013 | Jung | G06Q 30/0633 705/26.8 |
| 2013/0227455 A1* | 8/2013 | Lee | G06F 3/04883 715/769 |
| 2013/0309648 A1* | 11/2013 | Park | G09B 5/00 434/350 |
| 2013/0311329 A1* | 11/2013 | Knudson | G06Q 50/01 705/26.9 |
| 2013/0326583 A1* | 12/2013 | Freihold | G06F 3/04815 726/3 |
| 2014/0002387 A1* | 1/2014 | Hashiba | G06F 3/0488 345/173 |
| 2014/0045433 A1* | 2/2014 | Kim | F25D 29/00 455/66.1 |
| 2014/0101589 A1* | 4/2014 | Hyun | F25D 29/00 715/769 |
| 2014/0169640 A1* | 6/2014 | Park | F25D 29/00 382/110 |
| 2014/0195383 A1* | 7/2014 | Kim | G06Q 30/0633 705/26.62 |
| 2014/0232958 A1* | 8/2014 | Venturas | G02F 1/133615 349/12 |
| 2014/0248950 A1* | 9/2014 | Tosas Bautista | G06F 3/01 463/31 |
| 2014/0300265 A1* | 10/2014 | Lee | H04N 7/181 312/405.1 |
| 2014/0304126 A1* | 10/2014 | Kim | G06Q 10/087 705/28 |
| 2014/0313328 A1* | 10/2014 | Park | H04N 7/183 348/143 |
| 2014/0320647 A1* | 10/2014 | Seo | F25D 29/00 348/143 |
| 2014/0334691 A1* | 11/2014 | Cho | G06Q 30/0631 382/110 |
| 2014/0358287 A1* | 12/2014 | Lee | F25D 29/00 700/275 |
| 2015/0002660 A1* | 1/2015 | Lee | F25D 29/00 348/135 |
| 2015/0013364 A1* | 1/2015 | Schessl | F25D 29/00 62/180 |
| 2015/0047020 A1 | 2/2015 | Kim | |
| 2015/0052920 A1 | 2/2015 | Park | |
| 2015/0059374 A1* | 3/2015 | Hebel | F25D 29/00 62/125 |
| 2015/0112759 A1* | 4/2015 | Hong | G06F 16/00 705/7.29 |
| 2015/0161871 A1 | 6/2015 | Kim et al. | |
| 2015/0177969 A1* | 6/2015 | Stoufer | G06F 3/04847 715/746 |
| 2015/0267960 A1* | 9/2015 | Cheon | F25D 29/00 62/127 |
| 2016/0018158 A1* | 1/2016 | Yokoo | F25D 29/00 700/275 |
| 2016/0033194 A1* | 2/2016 | Sumihiro | F25D 23/04 62/125 |
| 2016/0057394 A1* | 2/2016 | Marutani | F25D 23/04 348/143 |
| 2016/0065911 A1* | 3/2016 | Maslan | H04N 7/188 348/155 |
| 2016/0086146 A1* | 3/2016 | Brown | G06Q 10/087 705/14.27 |
| 2016/0088262 A1* | 3/2016 | Lee | F25D 29/00 704/275 |
| 2016/0123657 A1* | 5/2016 | Kim | F25D 23/04 62/125 |
| 2016/0123658 A1* | 5/2016 | Kim | H04N 5/2252 62/125 |
| 2016/0123659 A1* | 5/2016 | Kim | G06T 7/246 62/125 |
| 2016/0138857 A1* | 5/2016 | Klingshirn | F25D 29/00 62/130 |
| 2016/0138860 A1* | 5/2016 | Kang | F25D 29/00 62/130 |
| 2016/0182864 A1* | 6/2016 | Izawa | H04N 7/181 348/159 |
| 2016/0203591 A1* | 7/2016 | Justaniah | G06T 7/0004 348/89 |
| 2016/0223250 A1* | 8/2016 | Kang | F25D 29/00 |

(56) References Cited

U.S. PATENT DOCUMENTS

| | | | | |
|---|---|---|---|---|
| 2016/0239179 A1* | 8/2016 | Kim | ............... | F25D 29/00 |
| 2016/0359325 A1* | 12/2016 | Kawata | ............... | H04L 12/2829 |
| 2017/0041520 A1* | 2/2017 | Carlotto | ............... | H04N 5/2252 |
| 2017/0109037 A1* | 4/2017 | Seo | ............... | G06F 3/0482 |
| 2017/0219279 A1* | 8/2017 | Chae | ............... | G01K 1/022 |
| 2017/0262973 A1* | 9/2017 | Johnston | ............... | F25D 29/00 |
| 2017/0364766 A1* | 12/2017 | Das | ............... | G06K 9/00771 |
| 2018/0172343 A1* | 6/2018 | Grimminger | ............... | F25D 29/00 |
| 2018/0259242 A1* | 9/2018 | Sumihiro | ............... | F25D 23/04 |

FOREIGN PATENT DOCUMENTS

| | | |
|---|---|---|
| KR | 10-20140059978 | 5/2014 |
| WO | 2012004747 | 12/2012 |
| WO | WO 2016036015 A1 | 3/2016 |

OTHER PUBLICATIONS

Docking and Floating ToolBars—Visual Studio 2015.
Samsung Family Hub Refrigerator, 2016.
Widgets—Android Developer, 2016.
Windows Media Player 12, 2016.
EPO Application No. 17847016.7-1009/3504613 (PCT/KR/2017009531), Extended Search Report, dated Aug. 6, 2019.

* cited by examiner

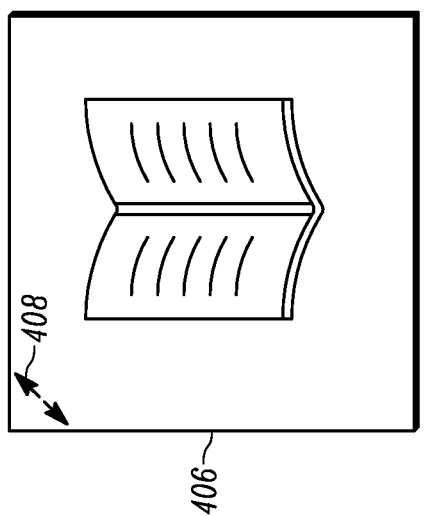
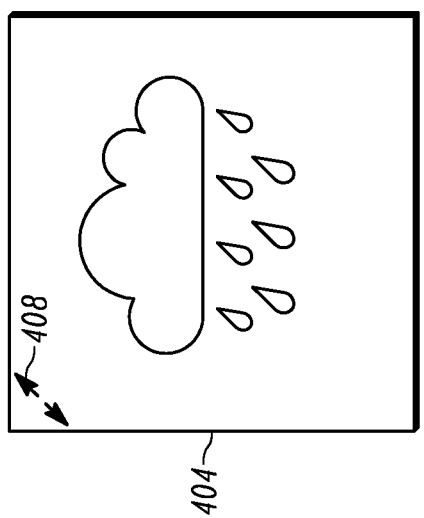
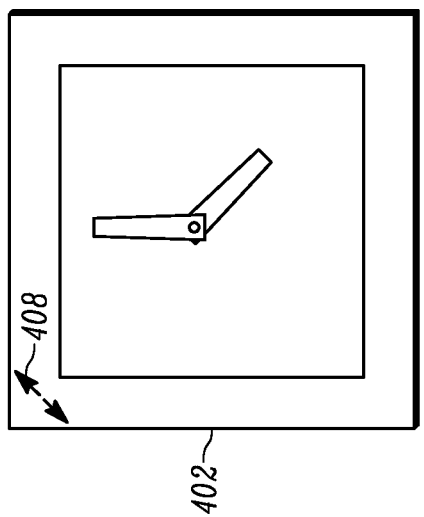
FIG. 4

| Sunday 19 | Monday 20 | Tuesday 21 | Wednesday 22 | Thursday 23 | Friday 24 | Saturday 25 |
|---|---|---|---|---|---|---|
| ○ 10:00 AM-11:50 AM Volunteer at community center ○○○○ 12:00 PM- 5:50 PM Potluck party at Bo's | ○ 1:50 PM-5:00 PM Band practice ○ 2:00 PM-4:00 PM Tennis practice | ○ 10:00 AM-12:50 PM Annual compliance training ○ 12:00 PM- 1:00 PM Lunch with Andy ○ 3:00 PM- 4:00 PM Dentist appointment ○ 3:50 PM- 5:00 PM SAT Pre session ○ 3:50 PM- 5:00 PM | ○ 2:00 PM- 4:00 PM Tennis practice ○ 5:50 PM- 4:00 PM Ride to ice hockey ○ 4:00 PM- 5:20 PM ice hockey club ○ 5:20 PM- 6:00 PM Pick up ○ 6:00 PM- 7:50 PM | ○ 9:00 AM-10:00 AM Financial adviser meeting ○ 12:00 PM- 1:00 PM Oil change appointment ○ 3:50 PM- 5:00 PM Band practice ○ 4:00 PM- 6:00 PM Math tutoring | Camping Trip ○ 2:00 PM- 5:00 PM AP info session ○ 5:10 PM- 5:50 PM Pick up from school | |

June 19 - June 25, 2016

FIG. 11

REFRIGERATOR STORAGE SYSTEM HAVING A DISPLAY

RELATED APPLICATIONS

This application claims priority to provisional Application Ser. No. 62/382,702 filed on Sep. 1, 2016 which is incorporated by reference herein.

FIELD OF THE INVENTION

Embodiments of the present invention relate generally to storage devices, and in particular, refrigerator storage devices and methods of implementing a refrigerator storage device.

BACKGROUND OF THE INVENTION

Refrigerators have become increasingly sophisticated with an ever-growing array of features. However, its central role in our daily life and unique position to connect family members and other devices haven't been fully utilized.

There is a need to develop novel features to allow a refrigerator to provide an enriched and fun experience for the whole family.

SUMMARY OF THE INVENTION

A refrigerator storage system is described. The refrigerator storage system comprises a display having a home screen and a processor coupled to the display. The processor is configured to display at least one widget that provides an operation on the display, wherein the at least one widget comprises an interface portion providing direct access to a feature of the widget. The direct access to the feature of the widget may be provided from the home screen.

According to another implementation, a refrigerator storage system comprises a display having a home screen and a processor coupled to the display. The processor is configured to display at least one widget associated with plurality of user profiles, wherein each user profile of the plurality of user profiles is customized to a corresponding user.

A further refrigerator storage system comprises a display having a home screen and a processor coupled to the display. The processor may be configured to display a widget on the display that provides information related to items in the refrigerator storage system, and allows for the grouping of a plurality of items in the refrigerator storage systems on the display.

Other features will be recognized from consideration of the Detailed Description and the Claims, which follow.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

FIG. 4 illustrates a plurality of widgets that may be accessible on a home screen of a refrigerator storage system;

FIG. 11 illustrates another implementation of a calendar application displayed in response to the Express Access selection a calendar widget on a screen of a refrigerator storage system;

DETAILED DESCRIPTION

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Methods and systems described herein allow efficient configuration and operation of a storage system including a smart refrigerator. Users can enjoy an improved experience interacting with the storage system and managing daily operations. Such methods and systems help users achieve the full capacity of the storage system. While the rest of the description using a smart refrigerator as an example, ordinary people skilled in the art will appreciate that the method and system described are applicable to other types of storage systems.

Figure 1:
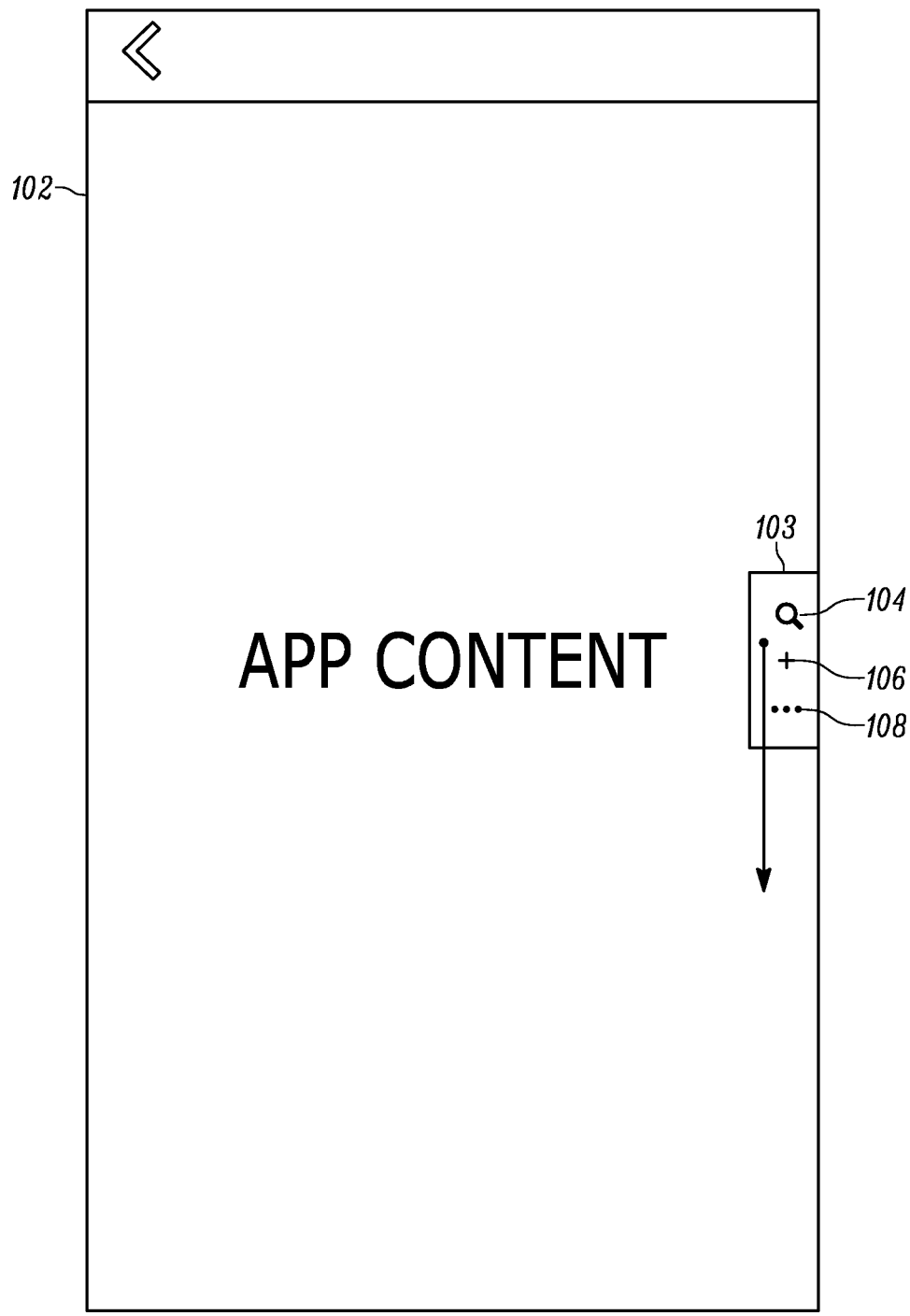
FIG. 1 illustrates an exemplary plan view of screen of a refrigerator storage system having a movable control button.
Figure 2:
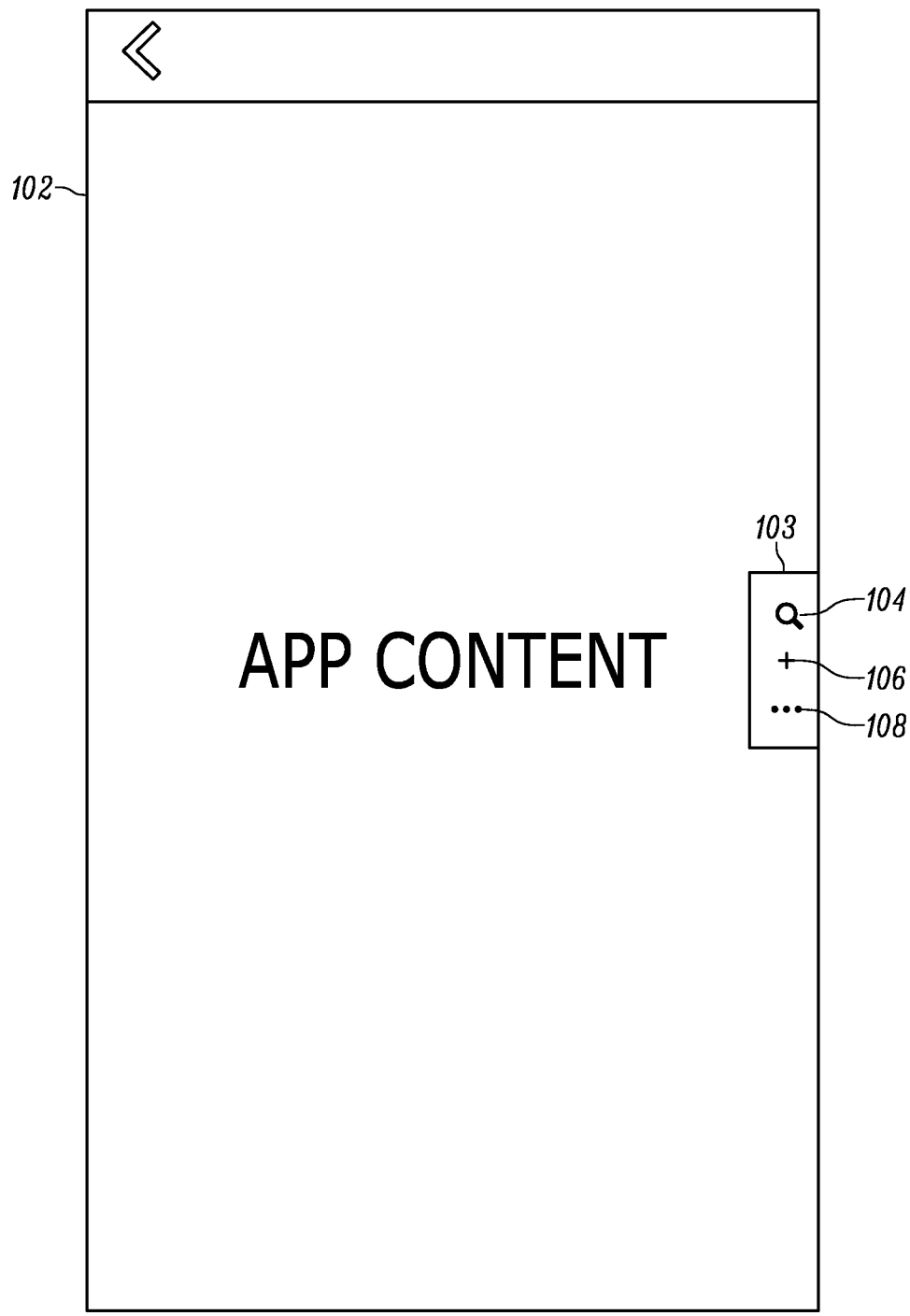
FIG. 2 illustrates an exemplary plan view of screen of the refrigerator storage system of FIG. 1 where the movable control button is moved to another location.

Turning first to FIG. 1, an exemplary plan view of screen of a refrigerator storage system compressing at least one touch screen display having a movable control button is shown. A screen 102, which may be a touch screen on a front door of a smart refrigerator for example, allows for the display of application content, and comprises a control button 103 having action buttons that function as control elements, including a search button 104, an add button 106, and an additional features button 108. The user can control smart refrigerator by way of the screen 102, operate applications and manage at least one connected device through a user interface (UI) presented on screen 102. The screen 102 could comprises any type of screen providing a "touch screen" functionality that would be suitable for selecting an action button on the control button. While certain action buttons are shown, it should be understood that other buttons that may be used by many applications or directed to a specific application.

An application may be launched by smart refrigerator and displayed on touch screen 102. Action buttons 104-108 are placed on a side panel appearing on the right-side or in the center of touch screen 102, by default. The number of action buttons can be an integer equal to or larger than 1. An action button is a UI control mechanism that will perform an associated action when it is tapped. An action button may take other UI forms such as checkbox, dropdown menu list, etc. Action buttons may be grouped together or individually displayed. Types and symbols of action buttons may differ from one application to another.

In one embodiment, all action buttons available for an application are displayed. In another embodiment, only one or some of the primary action buttons for the application are displayed. For example, when there are three or more available action buttons, the most used two action buttons are displayed and the additional action buttons are represented by an ellipses icon, such as additional features icon 108 as illustrated in FIG. 1. When the ellipses icon is tapped, an action drawer opens to display additional or all of the available action buttons. The alignment of the action buttons may depend on frequency of past user interaction, an order preferred by the user, or a sequence determined by smart refrigerator or the specific application.

A user can adjust the position of any action buttons, or the side panel including all of the actions buttons. In one embodiment, a user presses a finger on an action button and holds the press. Such a "press and hold" interaction changes the state of the action button that the user is interacting with into a moveable state. The user then can move the finger to another position on touch screen 102. As a result, the action button that the user initially pressed will move correspondingly. Upon a release of the finger, the state of the action button changes back from the moveable state to the stable state (i.e. the moving action button stays at the position where the user's finger is released). In one embodiment, the effect of the "press and hold" interaction changes the position of only the action button the user presses. In another embodiment, the effect of the "press and hold" interaction changes the positions of the group including the action button that the user presses. In yet another embodiment, the effect of the "press and hold" interaction changes the positions of all the action buttons.

It has been discovered that moveable action buttons improve a user experience by accommodating users at different heights. That is, movable action buttons allow access to a control means at a comfortable and convenient position. The side panel also reduces arm and eye movement for users. Such an improvement addresses accessibility issues, ergonomic issues, and allows young children to interact with touch screen 102. It has been further discovered that moveable action buttons help user navigate displayed content easier by moving buttons away from blocked content so that underneath content can be viewed.

Figure 3:
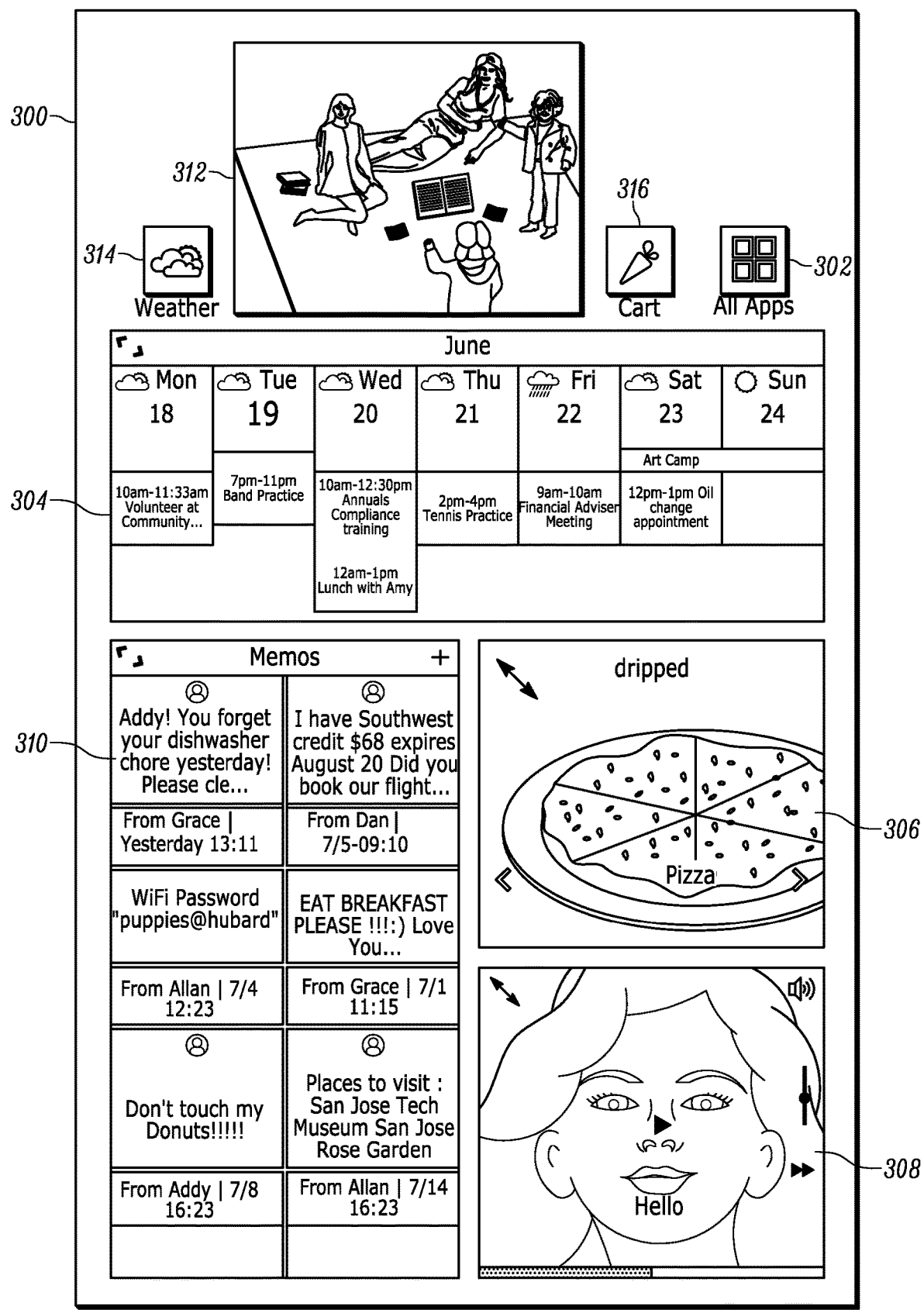
FIG. 3 illustrates an exemplary plan view of a home screen of a refrigerator storage system.

Turning now to FIG. 3, an exemplary plan view of a home screen of a refrigerator storage system is shown. The home screen 300 comprises user interface portions that present information and may be responsive to interactions of a user, such as a touch screen interaction. A plurality of interactive widgets are displayed on the screen, including an application widget 302 enabling a user to display all applications accessible by a user. A calendar application 304, which may have been opened in response to the selection of a calendar widget, provides calendar information. The calendar information can be displayed according to a default format, such as weekly format, or according to a user preference selected by a user, such as a particular user having administrator privileges. According to other embodiments, the particular widgets and formats for applications that are opened and displayed on the screen could be determined based upon a user that is identified as interacting with the display, as will be described in more detail below.

The home screen 300 displays selected content and provide access or links that can activate one or more applications. According to the embodiment of FIG. 3, a recipe application 306, a music application 308, a memo application 310, and a picture application 312 are shown. Other widgets are also shown, including a weather widget 314 and a shopping widget 316. In one embodiment, multiple widgets are simultaneously displayed on the home screen, where the number of widgets is an integer equal to or larger than 1. The widgets are interactive widgets, and each widget is linked with a corresponding application. Users may navigate, take actions and customize these widgets to be more engaged with the corresponding applications at the home screen level. That is, a user can interact with a widget and change a state of the widget in a Express Account Function without the widget occupying the entire screen, as will be described in more detail below.

An application can be configured to support one or more home screen Express Access UIs, and by default or based on user's choice, a specific UI may be presented when Express Access is enabled. For example, a calendar widget may show a week view UI, or a Day View with monthly calendar UI. The Express Access UIs of an application may have different appearance from the fully launched application UI. It has been discovered that Express Access improves the user experience by providing users with a quick access to features of an application that are likely to be accessed more often than the others. Further, allowing the user to customize which Express Access UI is presented at the home screen level provides more flexibility as one user may have a different demand level of specific features of an application from another user. Express Access features will be described in more detail below in reference to specific applications.

While particular applications and widgets are shown on the home screen, where some of the widgets associated with applications are opened, it should be understood that other widgets, including a time widget 402, a weather widget 404, and recipe widget 406 could be implemented as shown in FIG. 4, and different applications could be opened. While widgets are shown having a particular size relative to the screen in FIG. 3, it should be understood that users can choose various widget sizes for different purposes. A user is able to choose any one of the widgets for further interaction with the corresponding application. Interaction with an application through the corresponding widget can be achieved in various granularities. Tapping at different areas of a widget may deep link to a specific page of the corresponding application so that users can easily see the detailed information without leaving the home screen. Widgets have in-widget navigation through swiping gestures, including but not limited to swiping left, right, up, down, etc. for controlling navigation between pages and to reveal hidden content.

The user profile can further store a user's preference data. For example, applications, widgets, and/or UI display patterns may be user profile dependent. In one embodiment, an application can be associated with one or more user profiles. The application function, access privilege, content presented may differ based on the user profile. For example, a kid's user profile may only grant play function of a content playback application, such as a video or music player, but not the function of adding or deleting item on a play list, while a parent's user profile allows the parent to play, add, edit or delete the items on the playlist. In another embodiment, a home screen shows widgets of weather, time and calendar for a kid's user profile, and presents additional widgets such as stock, breaking news, etc. for a parent's user profile.

Figure 5:
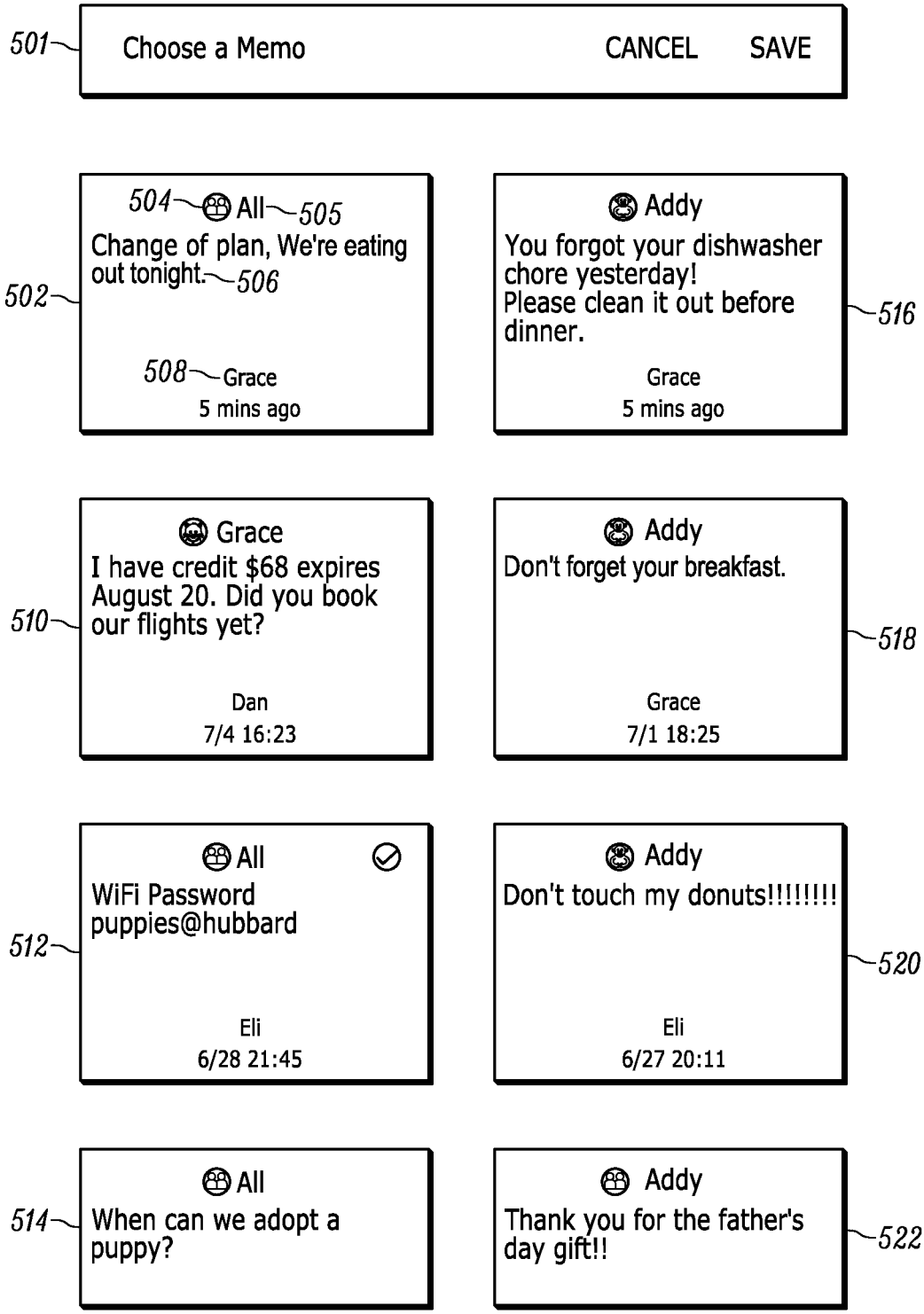
FIG. 5 illustrates an implementation of a memo application displayed in response to the selection a memo widget on a screen of a refrigerator storage system.

According to one embodiment, tasks of the "To Do" app are organized based on user assignments, where every user's tasks are displayed in a unique background color mapping to a color representation associated with a user profile of an individual user, as will described in reference to FIG. 5. It has been discovered that a color representation helps a user to focus on tasks or information that is relevant or directed to that user. The user will be able to glance over information displayed in a more efficient manner.

In one embodiment, a color representation may be utilized to change a color of a header, a banner, subject line or a portion of the application UI to identify for which user the displayed information is intended. In one embodiment, User A may select a profile icon representing a group to which User A belongs, and the information added by User A will be shown in the group color representation.

In one embodiment, a smart refrigerator allows express UI access to specific features of an application at the home screen level through interactions with the corresponding widget. Such an interaction is referred to as Express Access. Express Access does not open all features but only selected features of the application, to be accessible by the user at the home screen level. For example, the user can add an event to the calendar via Express Access UI of Calendar Widget without going through the Calendar App UI screen, as will be described in more detail below. A widget switches to Express Access UI when the user taps on a spot located within a displayed area of the widget, instead of launching icon 408, as shown in FIG. 4. FIG. 4 shows exemplary Express Access UIs of the Time App 402, Weather App 404, and Recipes App 406 can be accessed by selecting the widget (other than using a launch icon 408), where the Express Access UI will be displayed. If a user desires the full app to be displayed, the user could select the launch icon 408 from either the Express Access UI or from the widget.

The size and shape of each widget can be customized for each individual user. In one embodiment, a widget may be presented at a different size and/or shape based on the user profile retrieved based on user identification described above. In another embodiment, content provided by the widget is user profile dependent. For example, the calendar widget gives a month view as default for one user and a weekly view for another user. In another embodiment, a position of the widget on the home screen is also controlled by user profile.

The appearance of the widget may be further adjusted based on contextual data. In one embodiment, the size of widgets are enlarged when the smart refrigerator system determines that the viewing condition drops below a threshold value because of change of lighting conditions, distance of the user to the system, time of the day, etc. In another embodiment, one frequently accessed widget may enlarge its size over the widgets that have been accessed less.

Turning now to FIG. 5, an implementation of a memo application displayed in response to the selection a memo widget on a home screen of a refrigerator storage system is shown. As shown in FIG. 5, a control interface 501 includes various commands associated with the memo application, shown here as a CANCEL command and a SAVE command. A plurality of memos is also shown, including a first memo 502 having an identifier 504, which may identify a user profile or a group profile, and shown here as a group profile for all users. The identifier may be color coded for easier identification for a user or users of a group. By ways of example, the identifier itself may comprise an avatar or icon associated with the user, where the name of the user is in a particular color for the user. Alternatively, the identifier including any name or avatar may be in a colored background region, such as a rectangular region as shown in FIG. 4. Each memo may also comprise a message portion 506 and sender information 508, which may include a name of a sender and information related to a time when the message was sent, such as an actual time (i.e. hours and minutes for a particular date) or an elapsed time from when the message was sent. Other examples of memos are shown in memos 510-522, which are shown by way of example to show different users, message portions, and sender information.

The smart refrigerator system is able to determine when a user group profile applies, for a specific application, such as a memo application. In another embodiment, the system can make such a determination based on calendar events. For example, if an event is associated with only a mom and her kid, the system may apply the user group profile that includes only the mom and kid. The home screen and each widget shown on the home screen may be different from those when a user group profile of a mom and dad is applied. In another embodiment, the smart refrigerator system is able to track access of different users in a certain time period. For example, when the system determines that in the past 30 minutes, both the dad and kid has accessed the system, it may further determine that both dad and kid are at home now and the group user profile including these two should be applied. In yet another example, the smart refrigerator system may divide the touch screen based on the user group profile. For example, when mom and kid user group profile applies, the upper half of the screen will present home screen of the mom, while the lower half of the screen will display home screen of the kid, according to the data stored in the profile.

According to one implementation, a smart refrigerator supports multi-user interactions with user profiles. The smart refrigerator provides a registration process for adding new users. In one embodiment, registering a new user prompts the new user for user information including any of but not limited to, home address, work address, identification data such as a screen name and/or age, etc. The new user can set up an avatar and a color representation as well. Screen name, color representation and avatar are unique for each individual user registered with smart refrigerator. Upon completion of the registration process, a user profile is built for the new user. The user profile stores user information entered during the registration process. User profile may be saved at smart refrigerator or in the Cloud to allow access from anywhere through any device, with appropriate authentication. A user can update information saved in a user profile after the registration process. A user can use avatar and color representation provided by smart refrigerator, or the user can create a distinguishable avatar and/or color representation. New avatars and color representations can also be downloaded to the smart refrigerator from online sources or another connected device. The user profile may also be applicable to devices connected with smart refrigerator, such as for example, a microwave, a dishwasher, etc.

Applications have access to user profiles, and can take advantage of information stored in user profiles to personalize the application content. For example, the ToDo list application will query user profile and automatically create a ToDo list for every member of the family. Thus, different tasks can be assigned to the specific ToDo list, saving the user setup time.

Figure 6:
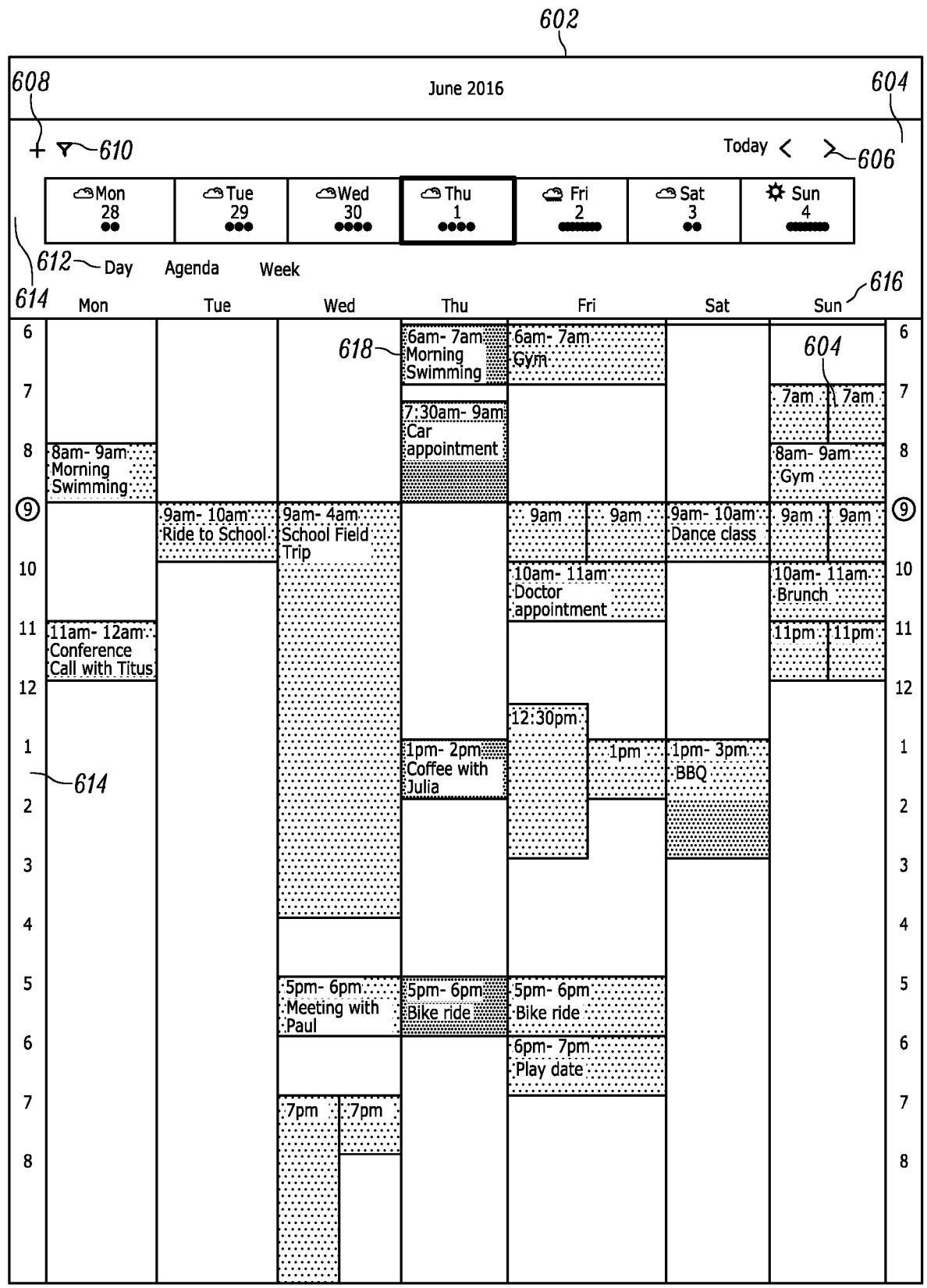
FIG. 6 illustrates an implementation of a calendar application displayed in response to the selection a calendar widget on a screen of a refrigerator storage system.

Turning now to FIG. 6, an implementation of a calendar application displayed in response to the selection a calendar widget on a screen of a refrigerator storage system is shown. More particularly, a header portion 602 provides a month and year for the period that is shown, and may include a control actuator portion 604 having control elements, such as forward/backward actuator 606 for advancing through weeks before or after a current week that is shown, an ADD control element 608 (i.e. plus sign) allowing a user to add an entry to the calendar, and information elements, such as an antenna 610 showing the status to a wireless connection to the refrigerator. A calendar selection field 612 allows the selection of the number of days that are displayed, such as a single day or a week, as shown in FIG. 6. Below the selection field 612 is an hourly display 614 of calendar entries for each day that is displayed. That is, for each day 616 (e.g. Monday through Sunday) that is displayed, calendar entries 618 are provided as entered by a user or provided from another application.

In one embodiment, users are able to filter the content presented by the application based on user profiles. In the example of the Calendar App, events can become crowded and less useful when there are many users, or fewer users with many events. User filtering helps provide a quick and simple way to decrease the density of information and focusing in on certain users, as desired. When user filtering turns a user profile OFF, that user's events will not appear until the user profile is switched to ON. In one embodiment, user filtering may be temporary so that certain users' events are only not shown for a limited time period. In one embodiment, an authentication mechanism is included to prevent unintended switching off of a user.

Figure 7:
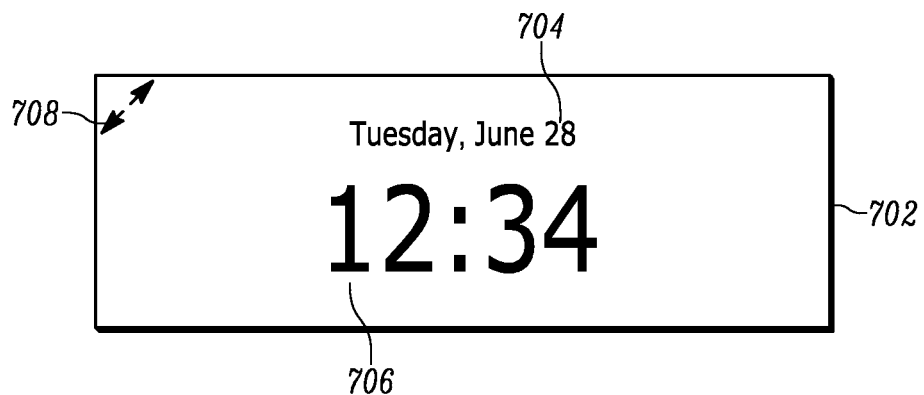
FIG. 7 illustrates an implementation of a time and date application displayed in response to the Express Access selection a time and date widget on a screen of a refrigerator storage system.

Turning now to FIG. 7, an implementation of a time and date application, displayed in response to an Express Access selection on a time and date widget on a screen of a refrigerator storage system, is shown. The time and data application 702 comprises a date field 704 and a time field 706. A control element 708 allows a user to expand the application to show additional information, such as times in other cities for example.

Figure 8:
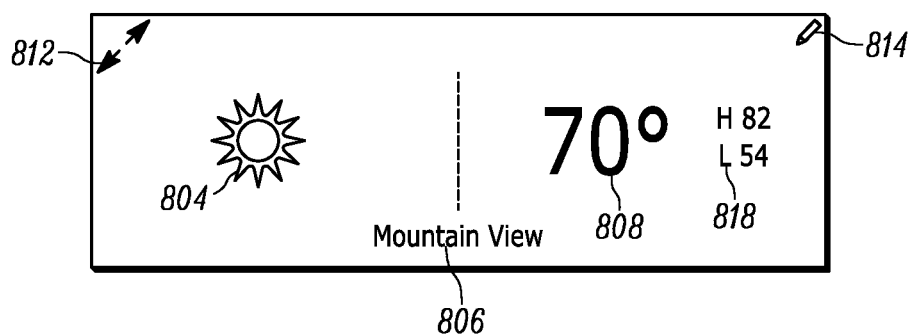
FIG. 8 illustrates an implementation of a weather application displayed in response to the Express Access selection a weather widget on a screen of a refrigerator storage system.

Turning now to FIG. 8, an implementation of a weather application, displayed in response to an Express Access selection on a weather widget on a home screen of a refrigerator storage system, is shown. The weather application 802 comprises a sun level field 804, a location field 806, a temperature field 808 and a temperature range field 810 which may indicate expected high and low temperatures for the day. The weather application may also include a control element 812, also known as an expand icon or launch icon, to expand the weather application to show additional information, such as temperatures in other locations or multi-day forecasts for a current location or other locations.

Figure 9:
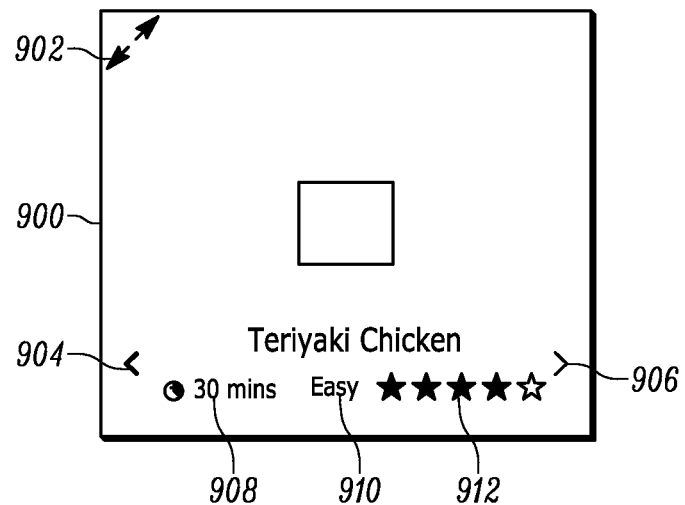
FIG. 9 illustrates an implementation of a recipe application displayed in response to the Express Access selection a recipe widget on a screen of a refrigerator storage system.

Turning now to FIG. 9, an implementation of a recipe application displayed in response to an Express Access selection of a recipe widget on a home screen of a refrigerator storage system is shown. A recipe application 900 allows a user to select the full screen application, such as by using a control element 902. In the Express Access mode of FIG. 9, a recipe, which may be the most recently viewed recipe for example, may be shown. A quick action associated with the recipe widget may expand the currently displayed widget to be expanded to provide additional information, such as ingredients and baking instructions for example. Alternatively, a user may cursor through other recipes using cursor backward cursor element 904 and forward cursor element 906. A preparation time field 808 may be included to allow a user to determine the amount of time required for preparation, a skill level field 910, and a rating field 912, which may include a rating between zero and five stars for example.

Figure 10:
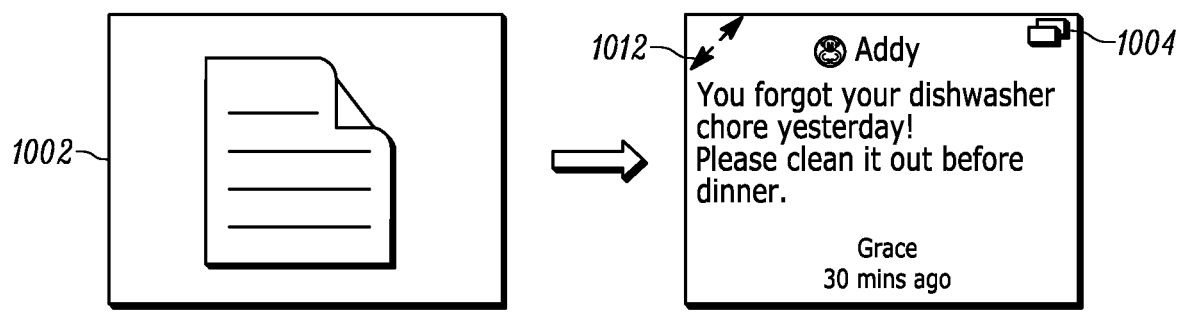
FIG. 10 illustrates an implementation of a memo generated after selecting a memo widget on a screen of a refrigerator storage system.

Turning now to FIG. 10, an implementation of a memo generated after selecting a memo widget on a home screen of a refrigerator storage system is shown. A memo icon 1002 can be opened to allow a user to enter information associated with the memo. That is, a user can select the memo icon to display a new icon, and then press a given field to enter information related to that field, where the information in FIG. 10 corresponds to the information in the memo 516 of FIG. 5 by way of example. Applications or users may define Express Access UIs for the home screen. For example, a memo widget may only show only one memo that the user has chosen to be displayed at the home screen level. The user can expand to full memo app by selecting the control element 1002, or choosing different memo through an action button 1004.

Figure 12:
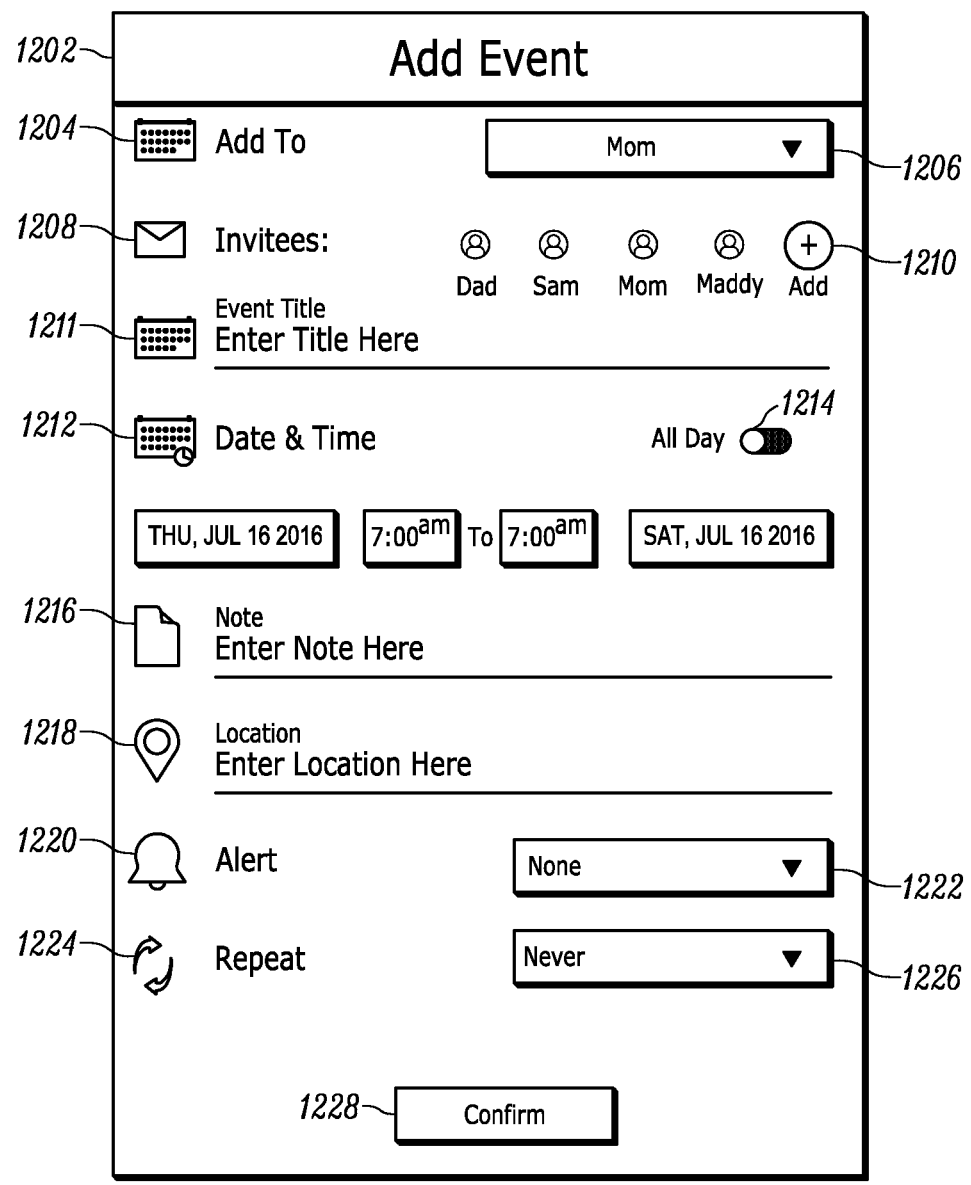
FIG. 12 illustrates an implementation of an event function associated with the calendar widget of FIG. 11 and generated in response to a quick action icon.

Turning now to FIG. 11, an implementation of a calendar application displayed in response to the Express Access selection on a calendar widget on a screen of a refrigerator storage system is shown, where an event can be added as shown in FIG. 12. According to the example of FIG. 11, the calendar application 1102 comprises a date range 1104, and a control element 1106 to expand the calendar application to display more information, such as more information related to the individual entries in the calendar. A quick action icon 1108 is also provided as a quick action element to add an event that will be displayed on the calendar.

FIGS. 11 and 12 illustrate an exemplary embodiment of a Quick Action feature. Widgets at the home screen level may have action buttons, which allow users to quickly add an item on a list, or to choose different content placed on the widget. Without action buttons, a user may have to go through multiple steps to be able to invoke a certain feature of an application. For example, the user needs to launch the application to its full scale first before selecting the specific action from a list of all available options. However, there are some features or actions of the application that the user calls more frequently. Using the Calendar Widget as an example, in one embodiment, when the user wants to add a new event, instead of launching the Calendar App and then choosing "edit" or "add," the user can tap at the Quick Action Icon 1108 shown in FIG. 11, where an Add Event window of Calendar App opens as a result as shown in FIG. 12. All the layout and elements are the same with Calendar App's add event page. Upon confirmation of adding the new event, the user has the option to go to the full Calendar App UI. Otherwise, the application will time out and return to the Calendar Widget UI.

Clicking on the launch icon 1106 of the widget, which is illustrated in FIG. 11, will launch the application to its full scale, where touch screen 102 switches the display from home screen as shown for example in FIG. 3, to the Calendar App UI. Quick Action Icon 1108 may cause corresponding application to be launched, if the application hasn't been launched yet. Quick Action icons may differ from one application to another. Available quick actions may be defined by system default, the application or the user. Quick Action improves the user experience by enabling a quick access to actions mostly wanted by the user.

The application content or feature that can be invoked by the quick action may be customized. In one embodiment, a user can associate her own user profile, with specific page, content, feature or function of the corresponding application. This means that the same Quick Action Icon will trigger different aspect of the application, based on who is interacting with it. For example, parents may want to go directly to add an item page of the application, while a kid may want to go directly to display of most recent edited items page of the application. Therefore, how a Quick Action Icon links to the specific function, feature, or content of the application may vary based on the identification of the user and the associated user profile.

Turning now to FIG. 12, an implementation of an add event function associated with the calendar widget of FIG. 11 is shown. According to the implementation of FIG. 12, various fields are provided to allow the entry and storage of information associated with an event, or to exit the event using control actuator 1202. Other fields allow a user to provide information associated with the event, such as an "Add To" field 1204 and a corresponding name selection field 1206 that allows a user to select one or more users or groups of user that are to receive the information for a calendar event for example. An invitee field 1208 can be selected, where a corresponding add button 1210 can be selected to add invitees in addition to any invitees that are already displayed. An event title can be selected in a field 1211, while a date and time field 1212 can be selected to enter date and time information. Additional information that may be relevant can be entered by selecting a note field 1216 and a location field 1218. An alarm can be set by selecting an alarm field 1220 and using a user selectable field 1222 to select an appropriate time for the alarm. The event can also be repeated at different times on the calendar by selecting a repeat field 1224 and using the user selectable field 1226 to select a repeat option.

Figure 13:
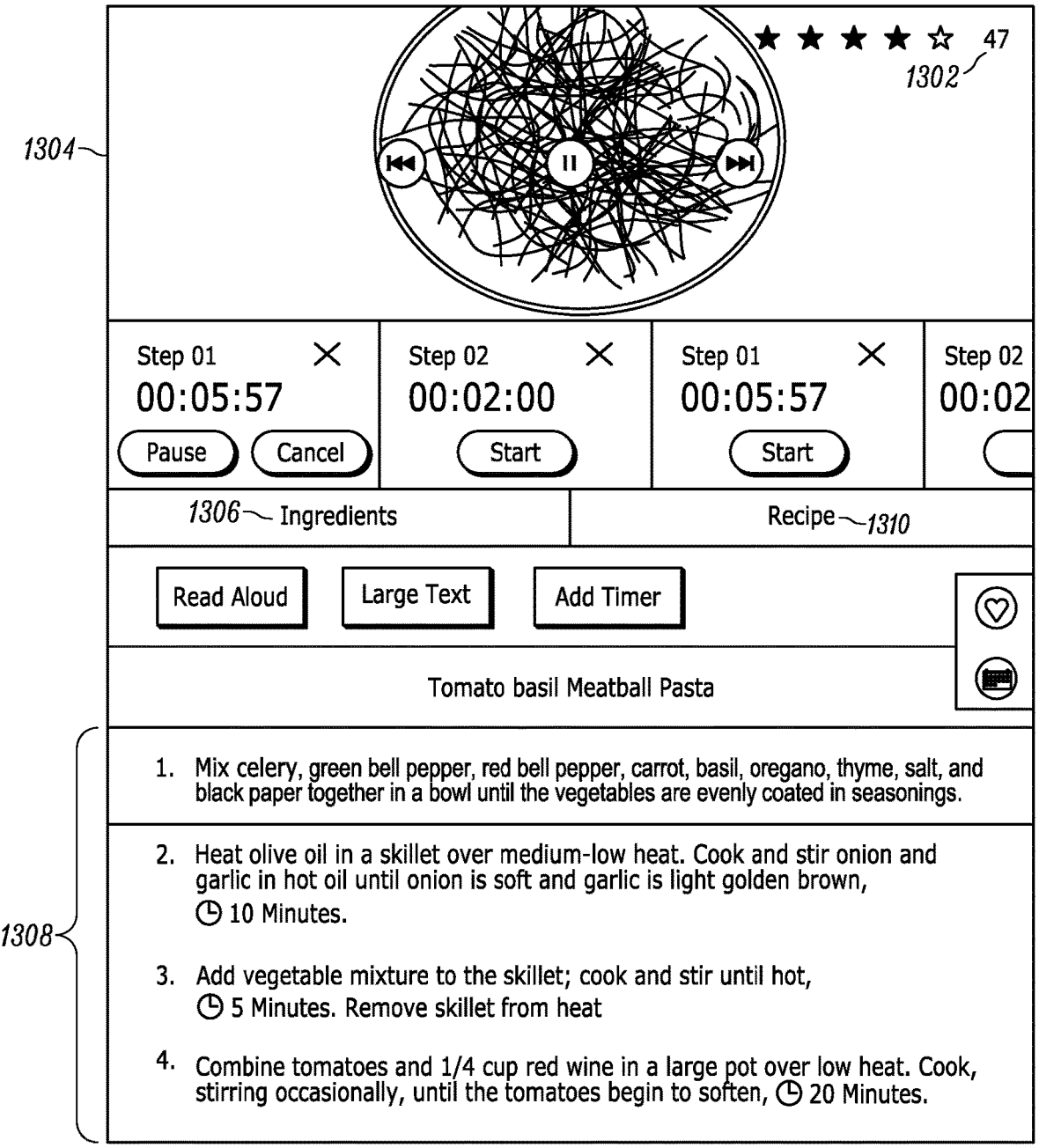
FIG. 13 illustrates an implementation of a recipe application displayed in response to the selection a recipe widget on a screen of a refrigerator storage system.

Turning now to FIG. 13, an implementation of a recipe application displayed in response to the selection of a recipe widget on a screen of a refrigerator storage system is shown. The recipe application can include different fields, including a rating field 1302 and a video field 1304 for displaying a video related to the recipe. A control portion may also include control elements. By way of example, an ingredient control element 1306 allows a user to view the ingredients for the recipe which are shown in the content portion 1308, while a recipe control element 1310 allows a user to view the recipe. A second step of the recipe can be highlighted, as show for example in FIG. 14. The recipe interface can be advanced using the touch screen interface controls or by voice activation for example. Other control elements may be implemented to select a text size, add annotations or select a timer feature for example.

Figure 14:
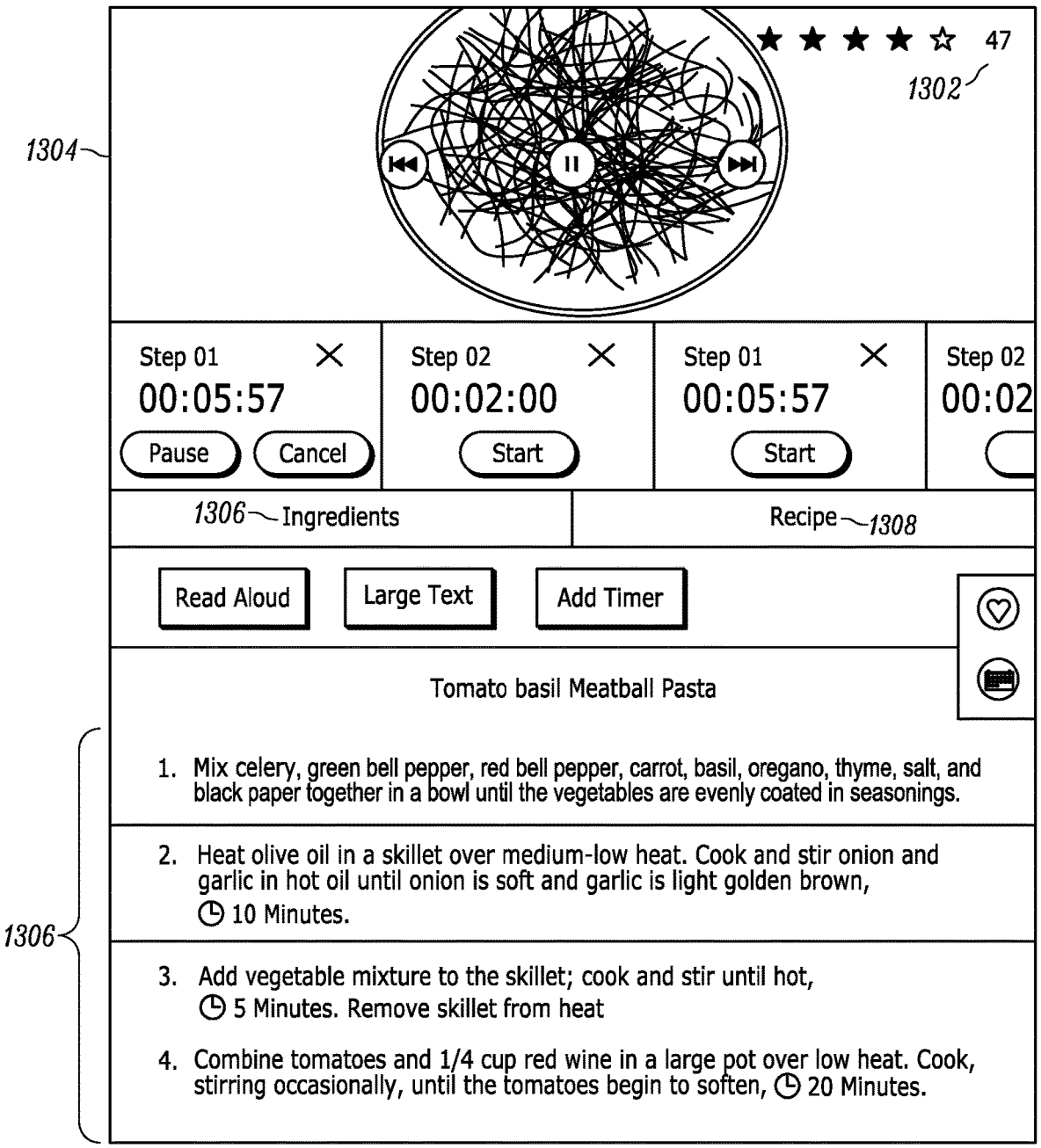
FIG. 14 illustrates a second step of a recipe displayed on a screen of a refrigerator storage system.

According to one an exemplary embodiment, a context-aware voice control element may be implemented. The smart refrigerator is capable of accepting voice inputs and translating them into appropriate operation commands based on context. Therefore, same voice input can lead to different operations due to the context changes. According to one implementation, a recipe is displayed on touch screen 102 for cooking one dish upon receipt of voice command "Read Recipe." The recipe has been broken down into one or more steps. When there are multiple steps, smart refrigerator is capable of presenting the recipe step by step and tracking the currently displayed step by highlighting the current step, as shown in FIGS. 13 and 14, where 4 steps are shown, and the first step is highlighted in FIG. 13 and the second step is highlighted in FIG. 14. Upon recognizing that the present user interaction context is under the recipe presenting mode, the smart refrigerator and the Recipes App are able to interpret the voice command "next" as going to the next step in the recipe, as illustrated in FIG. 14. Upon recognizing that the current context is under the content playback mode, smart refrigerator 110 and the content control application will interpret the voice command "next" as presenting the next content in the playback list.

Figure 15:
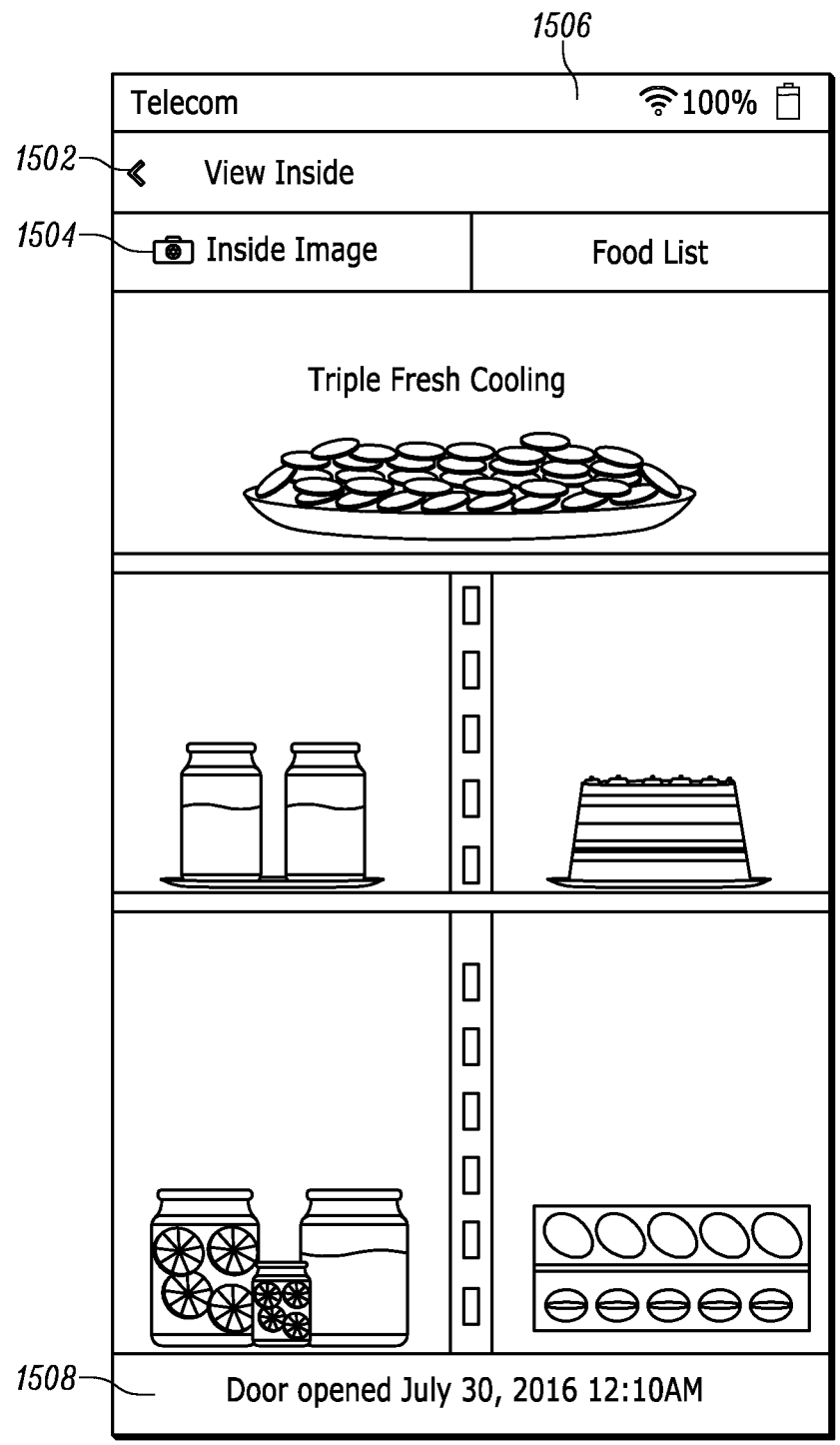
FIG. 15 illustrates an implementation of a camera application displayed on a screen of a refrigerator storage system.

Turning now to FIG. 15, an implementation of a camera application displayed in response to the selection a camera widget on a screen of a refrigerator storage system is shown. While in the camera application, a return actuator 1502 allows a user to return to another screen, such as a home screen. When in the camera application, a user would have the option of viewing the inside of the refrigerator by selecting a control element 1504 for displaying an image of the inside of the refrigerator, or by selecting a control element 1506 for selecting a food list. A status portion 1508 can provide status information, such as information about when the refrigerator door was last opened for example.

When a user accesses the smart refrigerator system, an image of the user may be captured by an imaging sensor coupled to the smart refrigerator. Also, the smart refrigerator may determine an interaction pattern of the user, such as the position of the touch screen that has been accessed, the manner of entering certain gestures (e.g., speed, distance and/or press force of a swipe, etc.) The user may access the smart refrigerator system via voice control, where the system can capture the voice input. Other types of biometric sensors coupled to the system can capture further data such as a height of the user, iris of the user, etc. Therefore, a user may be identified based on comparing the captured image, voice, interaction data with the information stored in user profiles. Such comparison may involve technology that is used to determine facial identification, voice identification, finger print, interaction pattern, height, body shape, etc.

Figure 16:
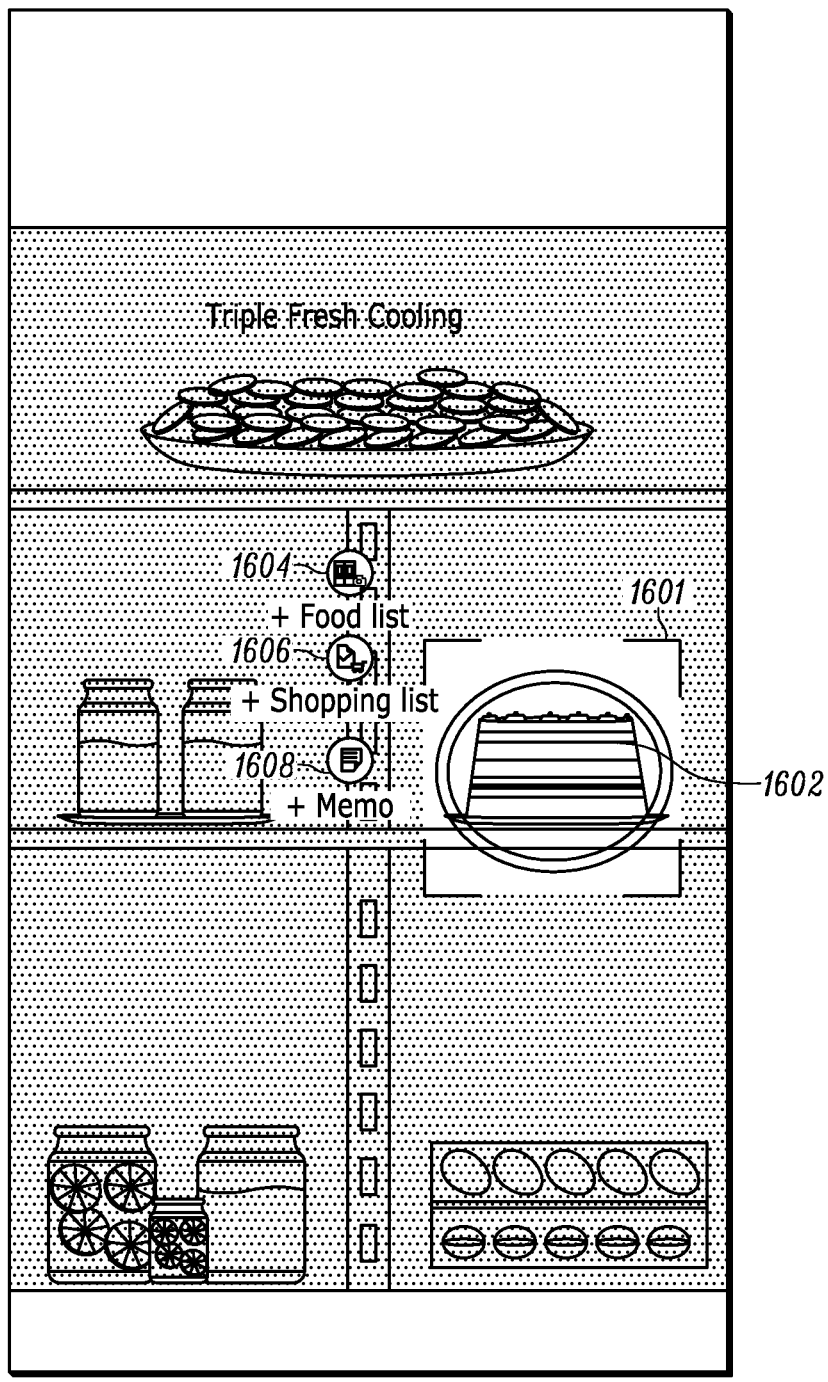
FIG. 16 illustrates a selection operation of the camera application of FIG. 15.

As shown in FIG. 16, a selection operation of the camera application of FIG. 15 is shown, where a bounding object 1601 isolates an image 1602 in the refrigerator, shown here as a cake. Icons provided next to the food item allow for an inventory function by allowing for the entry of information related to the food item. For example, a user could select the food list icon 1604 to enter information on a food list, such as information associated with the selected item in the refrigerator. A shopping list icon 1606 could allow a user to add the selected item (i.e. the cake) to a shopping list. Other options similar to or related to the selected item, such as a cake mix or frosting could be presented as an option to allow a user to add a different item to the shopping list. A memo icon 1608 could also be selected to allow a user to enter a memo related to the selected food item.

Accordingly, the smart refrigerator comprises one or more integrated cameras. The one or more integrated cameras are configured to capture one or more images of items stored inside smart refrigerator. In one embodiment, the one or more captured images are processed further to create an image, as illustrated in FIG. 15, to be displayed on touch screen 102, upon closing of the refrigerator door. Users are able to determine what is stored inside smart refrigerator based on a review of the image on the screen, without opening the refrigerator door again.

Users often need to take actions based on what is h available in the refrigerator. For example, a user may need to determine whether there is a need to go shopping for certain items, whether there are enough materials to follow a specific recipe, whether certain item will be expired soon, etc. In FIG. 16, a bounding object 1601 is displayed on top of image 1602 on touch screen 102. The bounding object 1601 may take different geometric shapes and various sizes. The geometric shape and size can be determined by smart refrigerator or based on a user preference. Bounding object 1601 can be transparent, opaque, colored or in various textures. Upon interaction, in one example, bounding object 1601 is displayed at the center of the image shown on the display. In another example, bounding object 1601 overlays an item shown in the image. In yet another example, bounding object 1601 is displayed at a position to which the user previously moved it.

A user is able to move bounding object 1601 around to overlay any part of the image. In FIG. 16, the user has dragged bounding object 1601 to the right side of image 1602, to where a cake is located. The user may use gestures to further control bounding object 1601. For example, the user can cause bounding object 1601 to rotate. The user can use pinch or finger spread gesture to change the size of bounding object 1601. In another embodiment, users can zoom in/out the image to help bounding object 1601 to select the item of interest. These gesture controls may help users more accurately capture an item of interest.

Once the user concludes the gesture control of moving bounding object 1601, one or more application icons may be displayed on the screen. In one embodiment, the one or more application icons may be displayed with bounding object 1601 from the beginning. The one or more application icons represent one or more applications that the user can further interact with related to the one or more items included in bounding object 1601. The one or more applications may be determined as a system default, by smart refrigerator based on recognized items of the image included in bounding object 1601, or recommended by smart refrigerator based on the user's past interactions. FIG. 16 illustrates one embodiment where application icons displayed are linked to applications of Food List 1604, Shopping List 1606 and Memo 1608.

Figure 17:
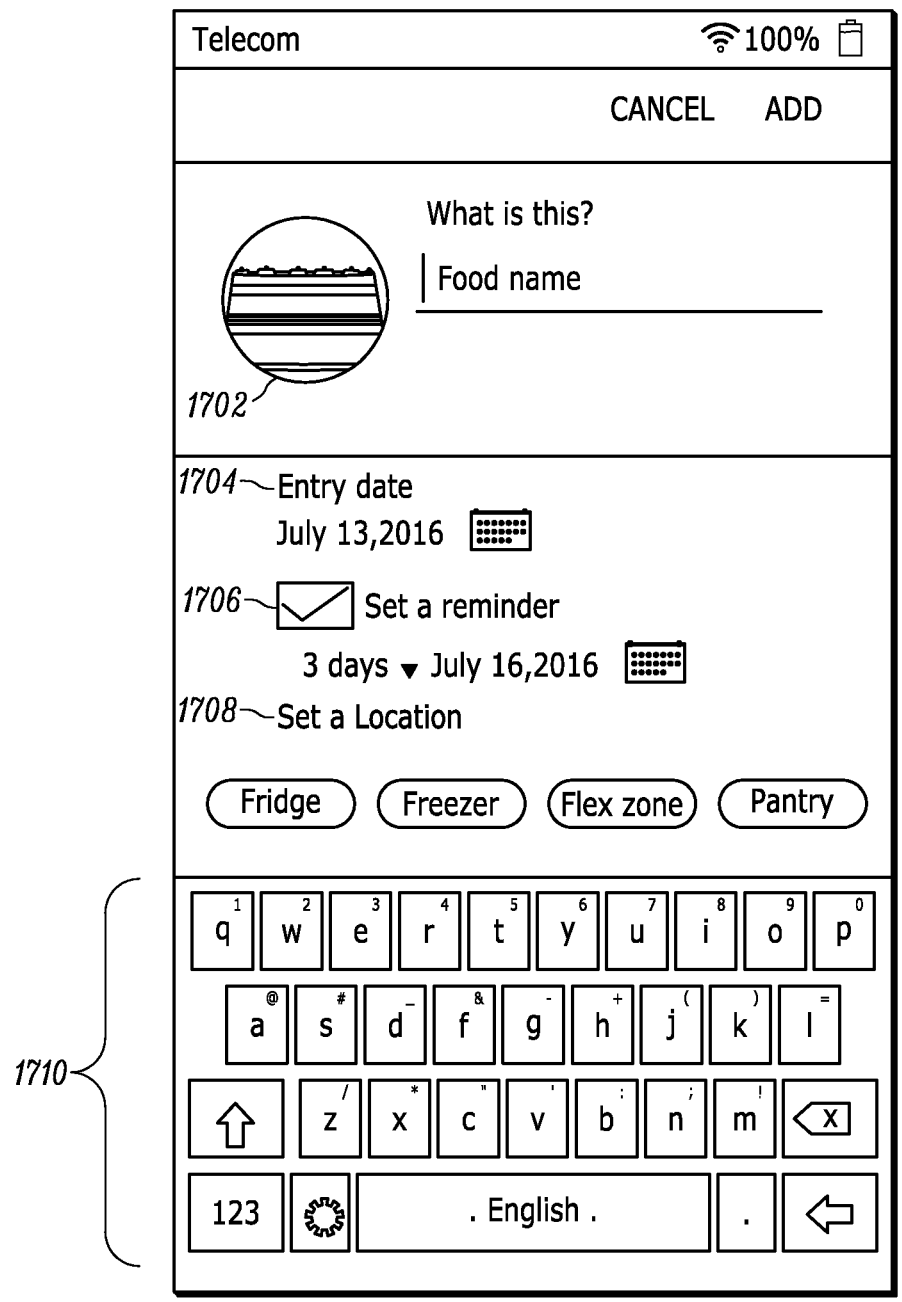
FIG. 17 illustrates an inventory function of the camera application of FIG. 15.

More particularly, the image within bounding object 1601 provides a "cut-out" snapshot of one or more items in smart refrigerator. The user can tap on anyone of the application icons to send the "cut-out" snapshot to the application. User can enter information that will be associated with the image portion bounded by bounding object 1601. As illustrated in FIG. 17, by tapping the Food List icon 1604, the one or more items are added into a food list, where the date of entry may be automatically recorded. The smart refrigerator can then track the age of the one or more items without requiring further input from the user. In addition, the user can set an expiry reminder to be notified when the one or more items are about to expire. FIG. 16 further illustrates UI supported by Shopping List App by selecting 1606 or Memo App icon 1608, when their corresponding icon is tapped associated with bounding object 504.

Figure 19:
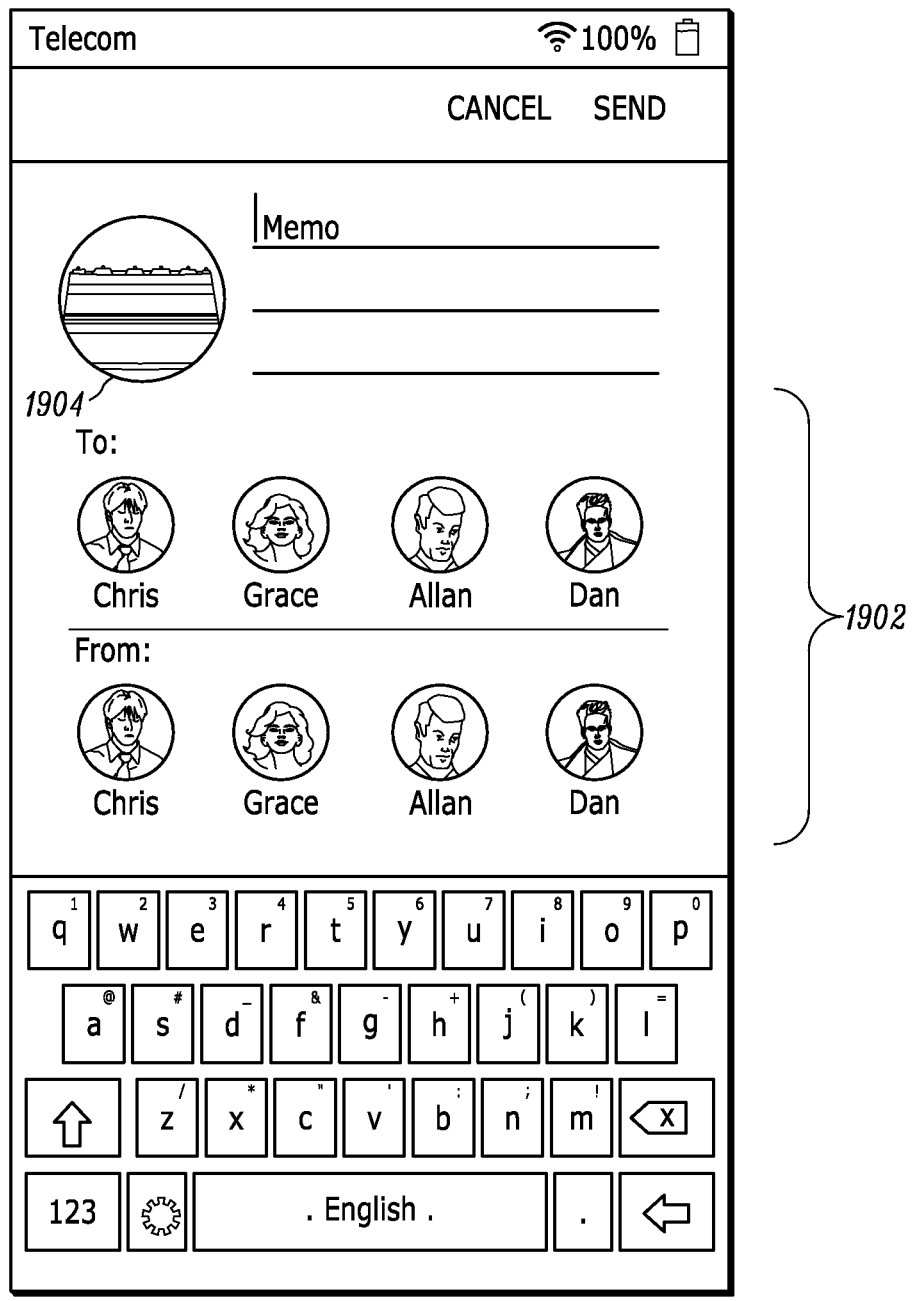
FIG. 19 illustrates a memo function of the camera application of FIG. 15.

Turning now to FIG. 17, an inventory function of the camera application of FIG. 16 is shown. More particularly, a keypad portion 1701 allows the entry of information for the selected food item to be added to a food list. A name for the food item could be added to a field 1702, where a picture of the item could be added next to the name to allow a user to recall details related to the food item. An entry date can be selected if not automatically entered in an entry field 1704, and a reminder can be set in a reminder field 1706. The reminder could allow a user to take action related to the item, such as consume or dispose of the item. A location of the item can be selection in a location field 1708. As shown in FIG. 19, examples of location options include fridge, freezer, flex zone and pantry. While the food list allows the selection of specific items in the refrigerator, the food list allows for the entry of food items from other areas of the kitchen, such as the pantry.

Figure 18:
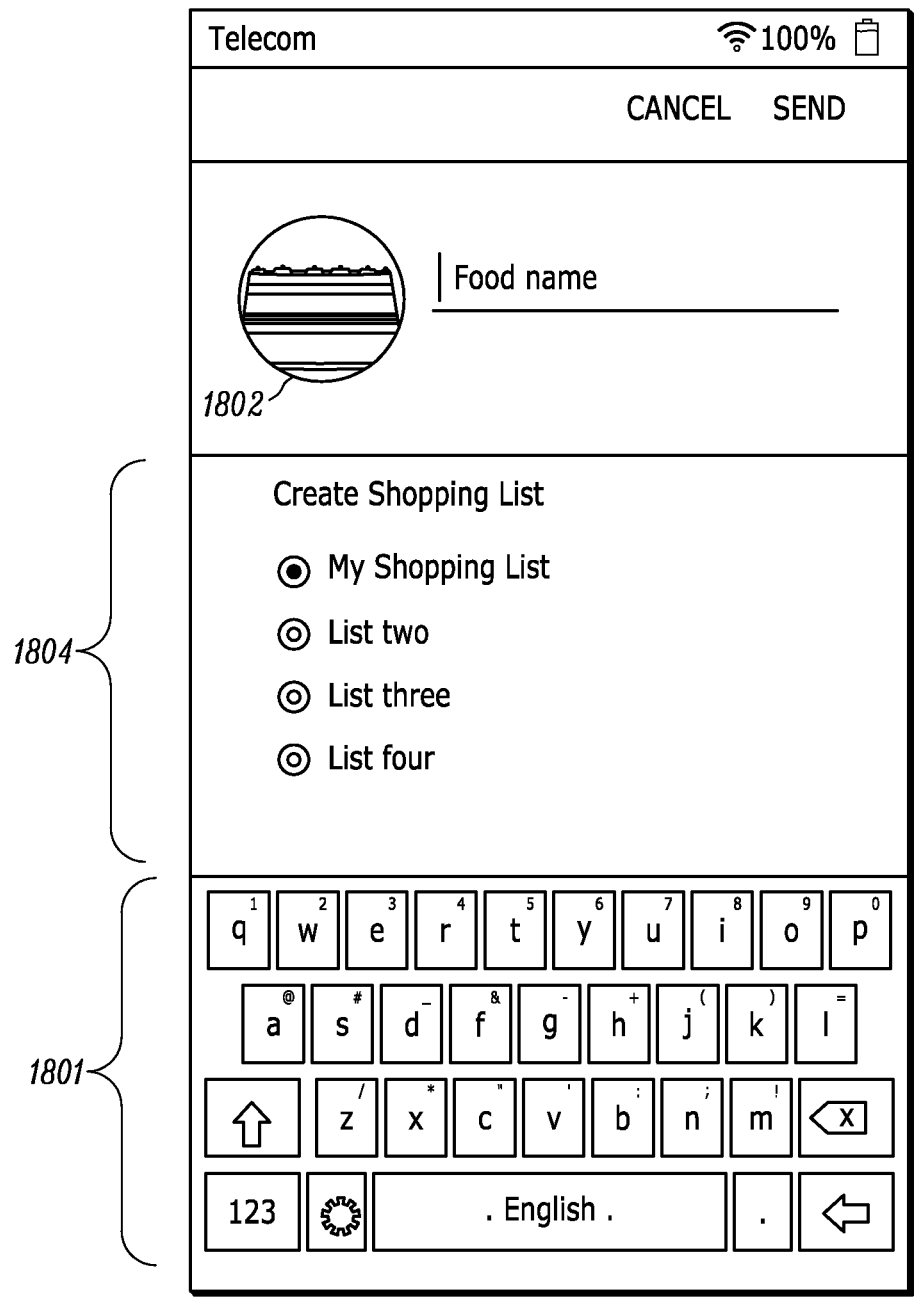
FIG. 18 illustrates a shopping list function of the camera application of FIG. 15.

Turning now to FIG. 18, a shopping list function of the camera application of FIG. 16 is shown. A keypad portion 1801 allows an entry of the name of the food item in a name field 1802 and an option to select a shopping list of a plurality of shopping lists in a shopping list field 1804. According to FIG. 19, a user could also send a memo to another user of a list of users 1902 related to a food item 1904, where a keypad 1906 could be used to enter the memo.

Figure 20:
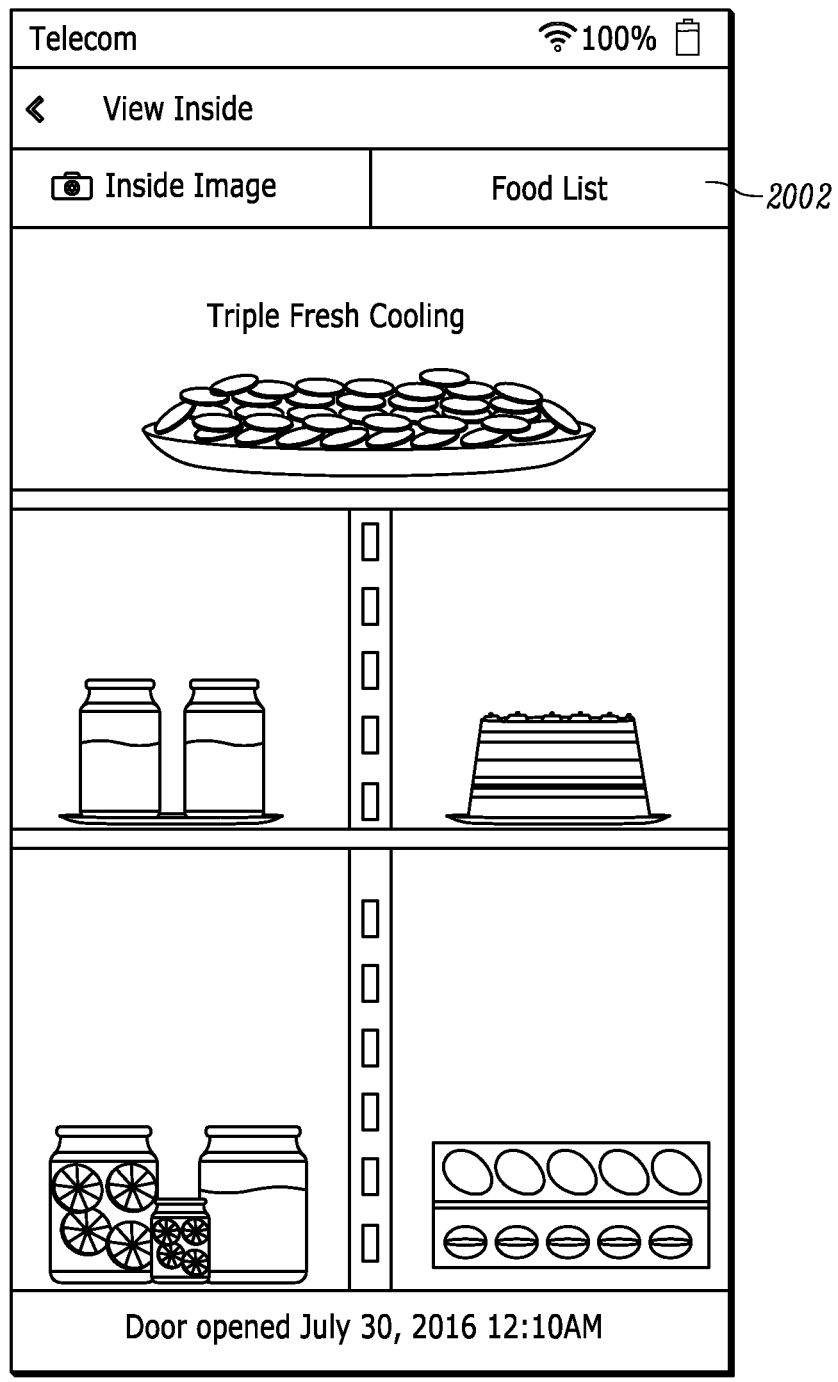
FIG. 20 illustrates a food list function of the camera application of FIG. 15.
Figure 21:
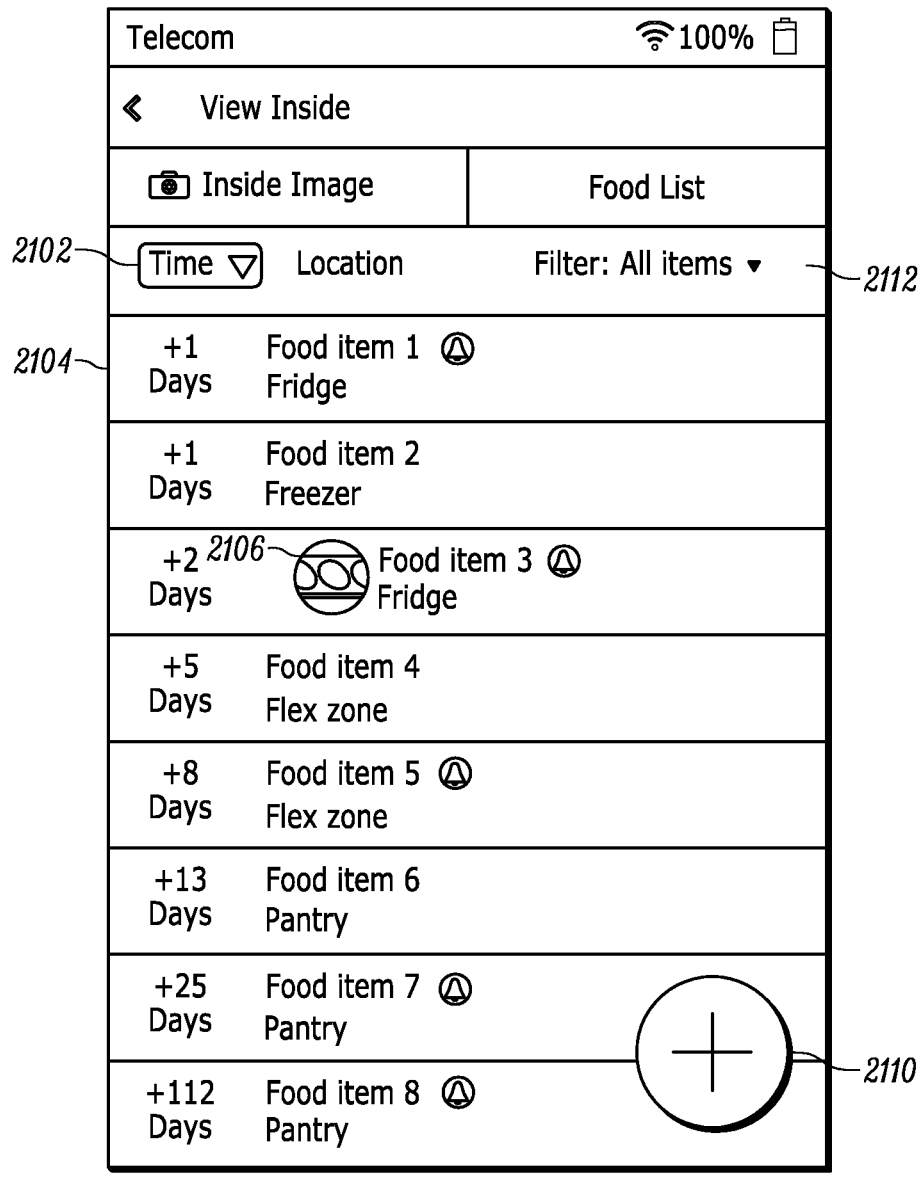
FIG. 21 illustrates a first filter operation of the food list function of FIG. 20.

Turning now to FIG. 20, a food list function of the camera application of FIG. 15 is shown. Users can choose to switch between camera view and the food list view, as shown in FIG. 20. The one or more items of the food list view can also be categorized or organized by location inside smart refrigerator by time, as shown in FIG. 21. FIG. 20 shows an exemplary diagram of View Inside. In one embodiment, the user is allowed to select multiple objects with multiple bounding objects or by enlarging the bounding object to include more items. In one embodiment, the user can drag the bounding object around to select more than one items. Upon recognition that multiple items are selected, the smart refrigerator can search for a recipe from the recipe app or external sources that can use every or a majority of the selected items.

In one embodiment, as images of inside of the smart refrigerator are taken every time its door is closed, the smart refrigerator is able to track a position of any individual item. The smart refrigerator may prompt warning information on the touch screen, or send notification to other devices that are coupled to the smart refrigerator, to notify or remind the user that one item hasn't been used for certain time. The frequency that such a notification is provided may be based on the type of the recognized item. The smart refrigerator may also recommend actions based on the recognized item and the time period the item has remained untouched. For example, if the item is recognized as brie, the smart refrigerator may send out notification after realizing that the cheese hasn't changed position for a couple days. However, if the item recognized is parmesan, the notice may not be triggered until a determination that the cheese hasn't changed position for a couple months. In one embodiment, the smart refrigerator system may determine that certain objects haven't been consumed if the weight of the shelf that the objects are placed hasn't been changed.

It has been noted that many times users open the refrigerator just to check what is inside or certain information for an item without putting in or taking out anything. However, the more frequent opening of refrigerators, the greater the energy consumption. Therefore, it has been discovered that enabling interactions based on knowledge of items stored inside the refrigerator, without opening the refrigerator, helps reduce power consumption and save energy.

In one embodiment, the smart refrigerator system has a color coding system that uses various colors or gradients to indicate the time duration an object has been stored in the smart refrigerator. For example, after image processing of the objects captured in the image as shown in FIG. 20, each object may be outlined in corresponding color indicating time lapsed from the point the object as placed into the smart refrigerator. The smart refrigerator may also determine when to send the notification based on the refrigerator settings. Lower temperature may result in a longer time period before the notice is sent. A notification may be provided on the display, in response to a selection of an information icon on the display, or by a text message or email to a user.

In one embodiment, the smart refrigerator system is able to present additional information based on the recognized object and the user. For example, while sometimes the general nutrition data (calorie, sugar, sodium, etc.) is provided to all users or specifically for users whose user profile contains specific health conditions such as diabetes or allergy, warning information is presented to alert a user of the side effect or even danger of consuming certain object. In another example, while expiration time is displayed for fresh produce, such data may not be shown for canned food which has long shelf life.

In one embodiment, the user can proceed to purchase the item included in the bounding object. The smart refrigerator can confirm user purchase authorization using various mechanisms. For example, a user can place a hand or certain fingers on the touch screen, with each finger mapped to a certain payment option. In another example, payment option may be represented by finger combinations (e.g., one finger means using a first bank card (e.g. a debit or credit card), while four fingers together means using a second bank card.

Payment confirmation may also be entered based on combination of fingers and motions of these fingers. For example, User A may set up a user profile to include payment confirmation as putting both index and middle fingers on the touch screen followed by a 90 degree turn clockwise.

In one embodiment, additional sensors may be coupled to the smart refrigerator to collect data to help determine quality of the item. For example, various electrospec/spectrascopy sensors may be used to analyze carbon construction changes. The smart refrigerator may have access to a knowledge base containing profiles of different items. Therefore, the smart refrigerator is able to determine what type of items are stored and determine the time lapse of the item based on the difference between the determined item spectra and the spectra profile of such item.

Identification data captured by sensors of the smart refrigerator can further include biometrics information such as fingerprint, iris print, facial print, voice print, height, body shape, and patterns such as interactions with the touch screen, grip of the door of the smart refrigerator system, etc. of the user to help identify the user.

Based on the object recognition and monitoring, the smart refrigerator is able to provide more meaning information to the user. For example, the smart refrigerator may warn the user of an imbalanced diet based on observances of more meat has been consumed than vegetables in a certain time period.

In one embodiment, the smart refrigerator system is able to display further augmented information. For example, based on knowledge of the interplay between or the impact of one type of item to another (e.g., pile up item A on top of item B may cause item B to expire faster), the smart refrigerator may display information asking the use to move one item away from the other, or group certain items together in one area or zone. In another embodiment, the smart refrigerator can remind the user that certain items do not need to be refrigerated. In another embodiment, the smart refrigerator can provide suggestion to help user optimize the storage space upon realizing that the user has purchased additional food items. Such suggestion may be associated with visual display showing various storage combination options.

In one embodiment, more imaging sensors are installed so that they can capture images of items inside each drawer or container of the smart refrigerator. To help user understand items stored inside such drawers, instead of only showing a direct image capture of the drawer, the drawer image may be augmented with textual display showing item type and number or weight of such items. In another embodiment, a bird's eye view may be presented illustrating the inside of the drawer while items placed on the shelfs are displayed as directly captured.

Figure 22:
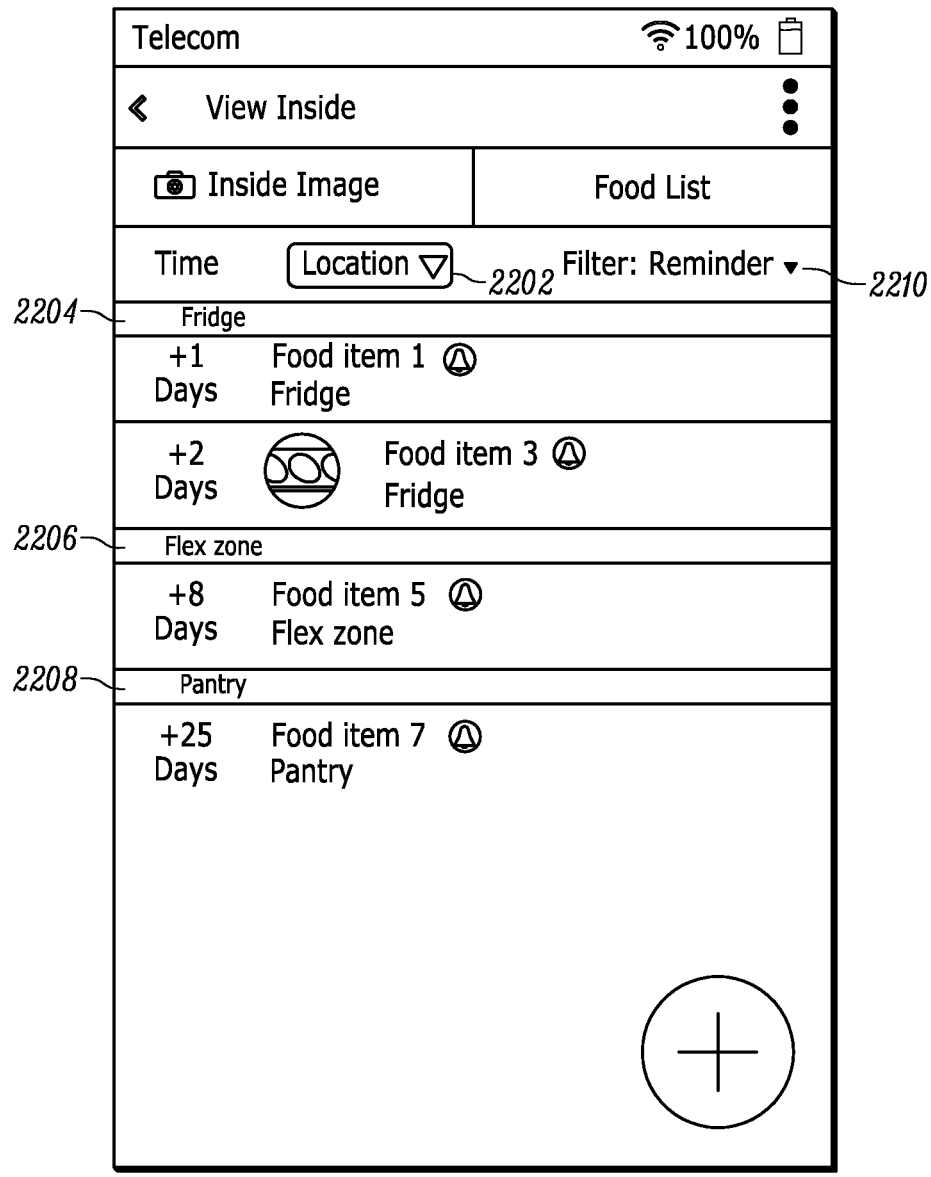
FIG. 22 illustrates a second filter operation of the food list function of FIG. 20.

As shown in FIG. 21, a food list function may be selected by the user. According to the implementation of FIG. 21, a user can select a control element 2102 to enter a food list to display different representations of food lists, as shown in FIGS. 21 and 22. More particularly, as shown in FIG. 21, a time display option 2102 can be selected to show items, such as a first food item 2104, of a food list in order, where a number of days after which the item was stored may be displayed. As shown with the example of item 2106, a picture or avatar may be displayed with the food item. A new food item can be added by selecting the add button 2110. The items which are displayed according to time can also be filtered by using a filter option 2112. The filter can be used to select a group of foods according to categories of food (e.g. dairy, produce, breads, etc.), dietary considerations (non-fat, low carb, etc.) allergy considerations (gluten-free, peanut free, etc.), items with a reminder category, or any other category that would help a user understand the content of food items in the refrigerator. When the location option 2202 is selected as shown in FIG. 22, items in the refrigerator are shown with categories, including for example a refrigerator category 2204, a flex zone category 2206, and a pantry category 2208. A filter option 2210 can be selected to allow user to show only those items of interest. The categories that can be selected by the filter 2210 could be the same as those of the filter 2112 of FIG. 21, or could be different category items more relevant to location.

Figure 23:
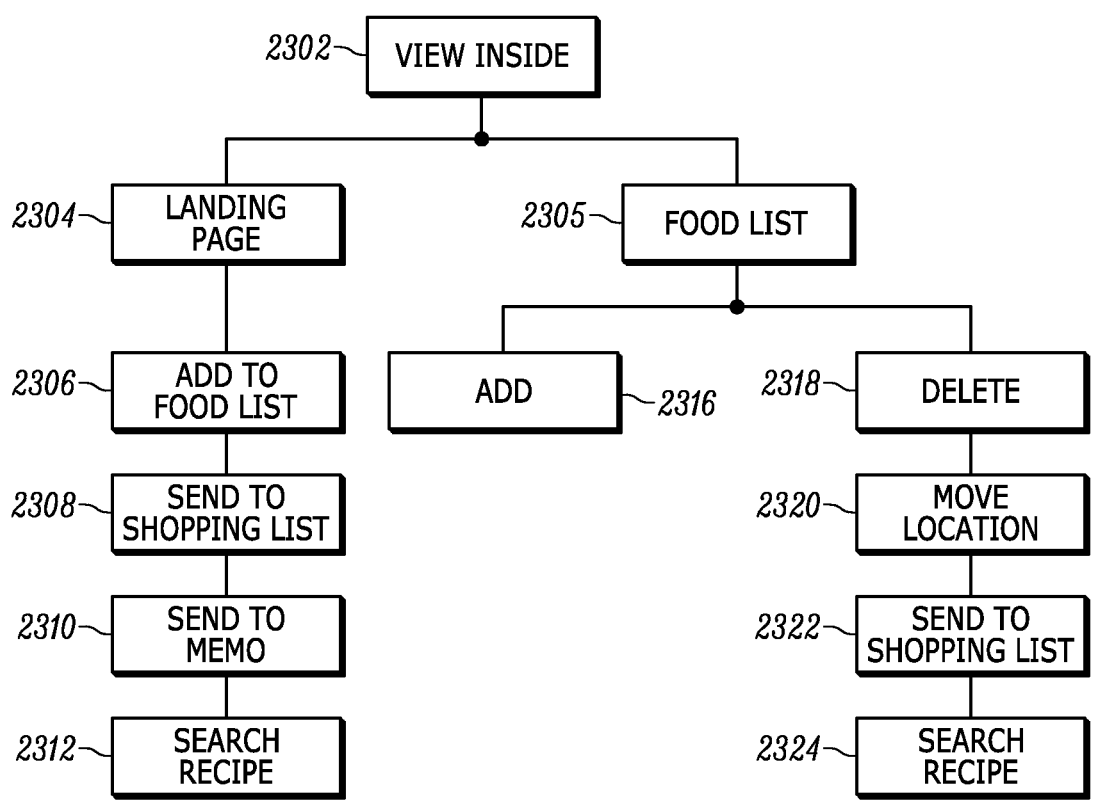
FIG. 23 illustrates a menu option for a feature of viewing inside of refrigerator storage device.

Turning now to FIG. 23, a menu option for a feature of viewing inside of refrigerator storage device is shown. When a user selects a "view inside" option 2302, a user would have the option of entering a landing page 2304 or a food list 2305. From the landing page, which shows the inside of the refrigerator, a user can select an individual item in the refrigerator, and then select an "add to food list" option 2306, a "send to shopping list" option 2308, a "send to memo" option 2310 and a "search recipe" option 2312. If a user selects the food list option 2305, a user can add an item by selecting the "add" option 2316, or edit information related to an item already on the food list. More particularly, a user could select a "delete" option 2318, a "move location" option 2320, a "send to shopping list" option 2322, and a "search recipe" option 2324.

Figure 24:
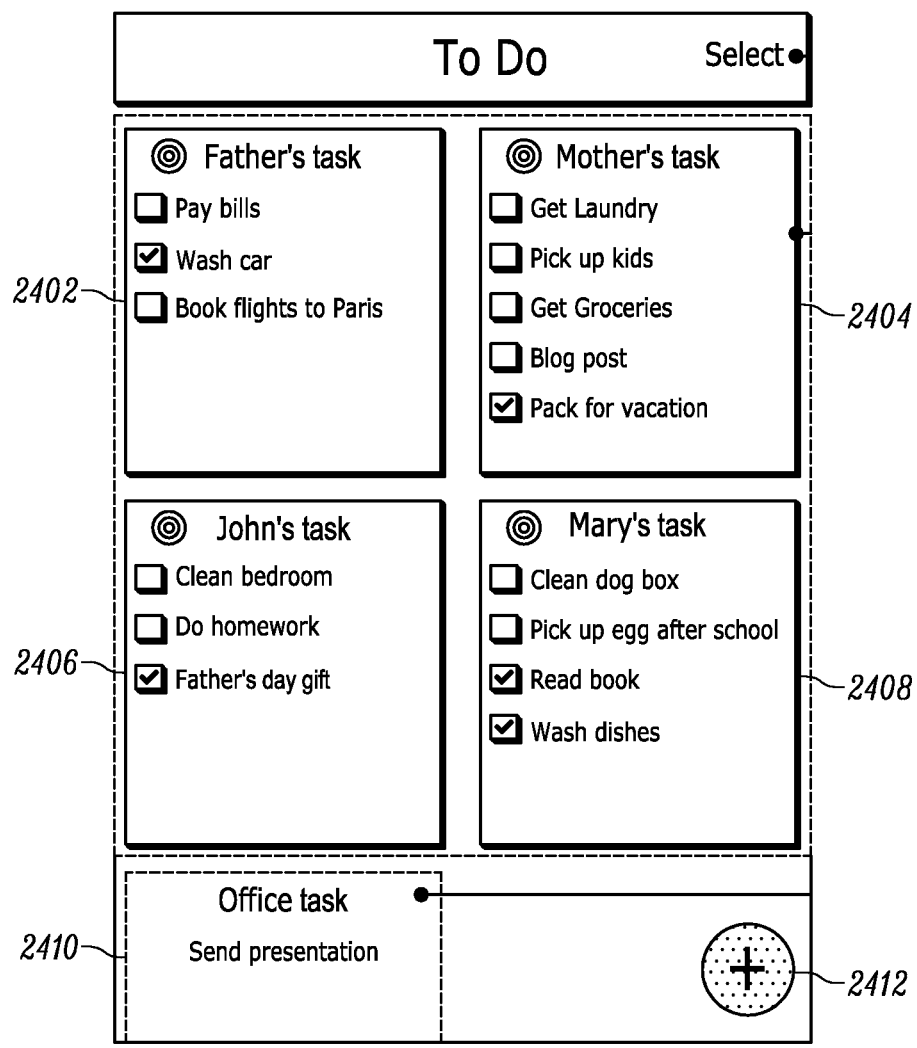
FIG. 24 illustrates an implementation of a "ToDo" application displayed in response to the selection a "ToDo" widget on a screen of a refrigerator storage system.

Turning now to FIG. 24, an implementation of a "ToDo" application displayed in response to the selection a "ToDo" widget on a screen of a refrigerator storage system is shown. The "ToDo" application comprises entries associated with specific users, shown by way of example a Father's task item 2402, a Mother's task item 2404, a John's task item 2406, a Mary's task item 2408, and an Office task item 2410. A new item can be added by selecting an Add option 2412.

Figure 25:
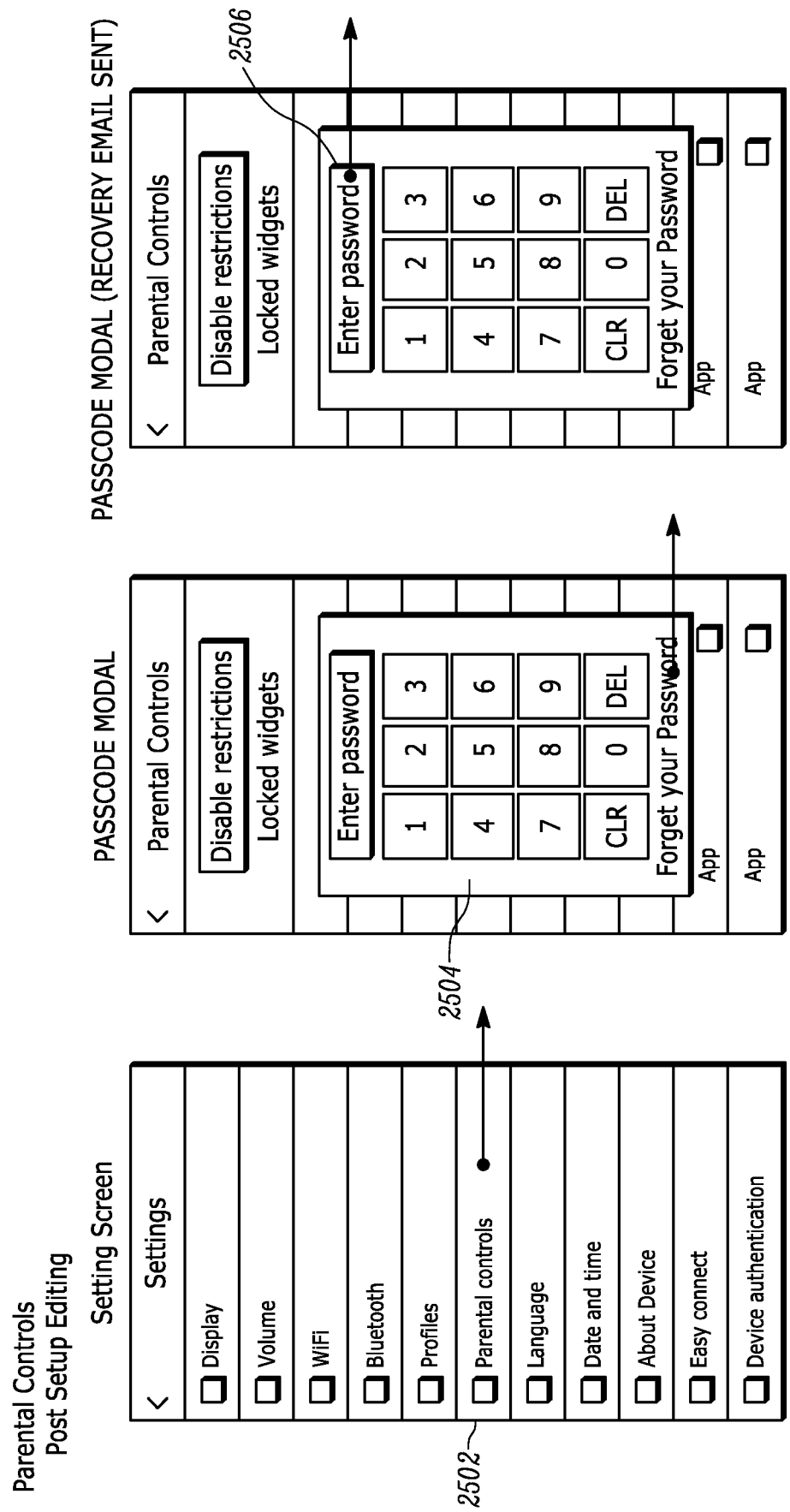
FIG. 25 illustrates an implementation of a parental controls application associated with a refrigerator storage system.
Figure 26:
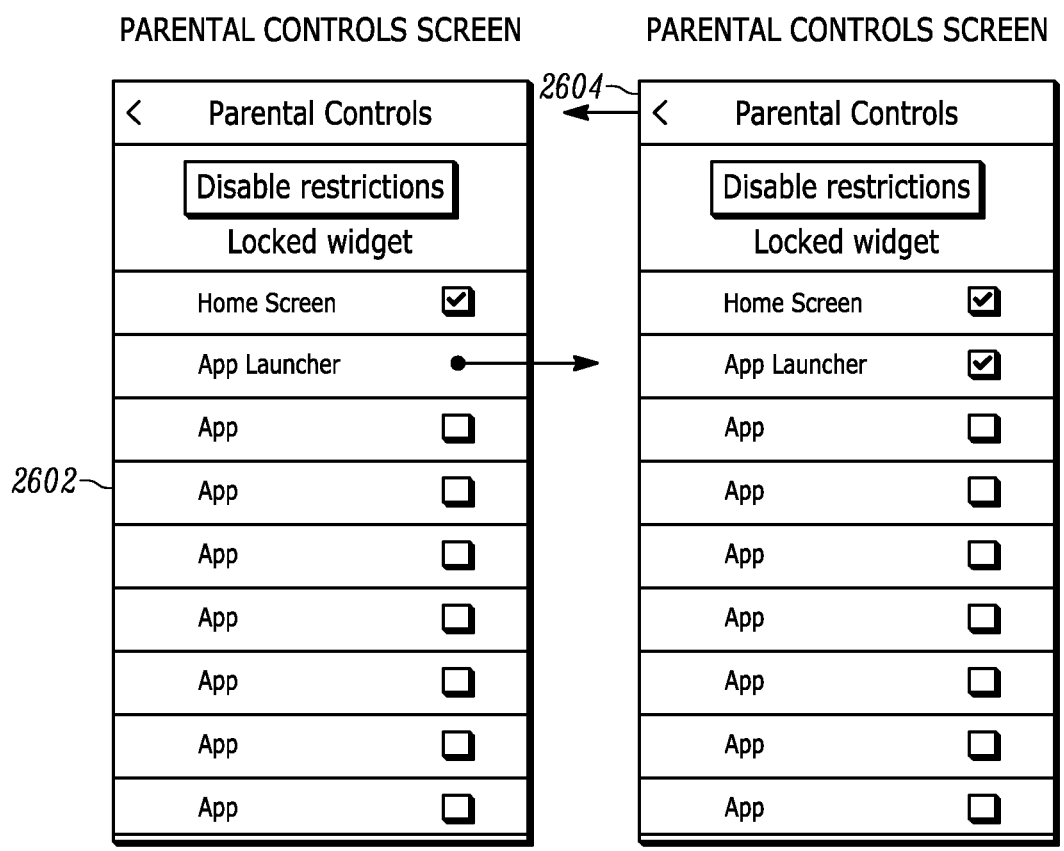
FIG. 26 illustrates a passcode feature of the parental controls application of FIG. 25.
Figure 27:
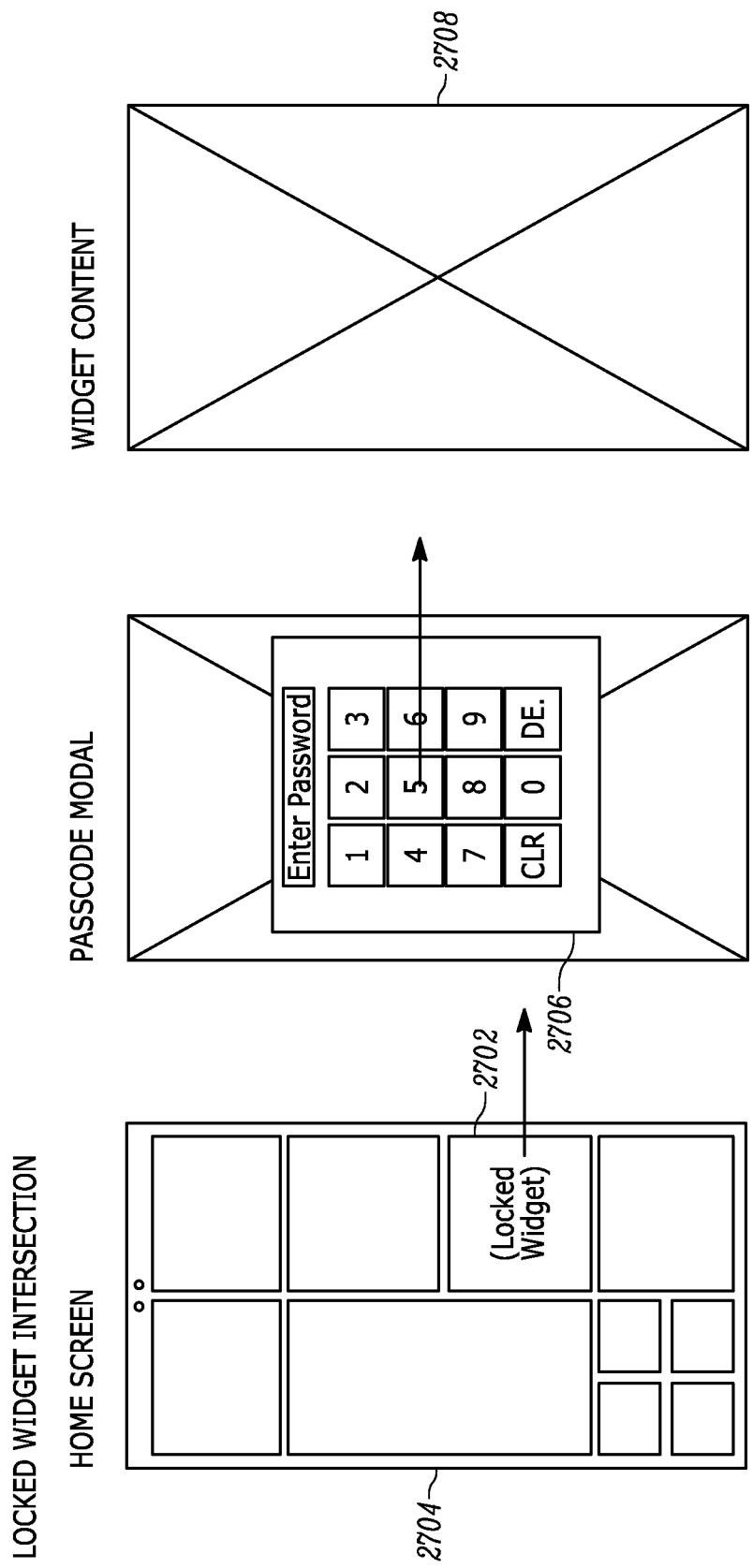
FIG. 27 illustrates another implementation of the passcode feature of the parental controls application of FIG. 25.

Turning now to FIGS. 25-27, an implementation of a parental controls application associated with a refrigerator storage system is shown. As every member of the family can interact with the smart refrigerator, there may be a need to restrict access to certain applications or a function of an application, for the benefit of restricting access either by age appropriateness or for personal privacy reasons. In one embodiment, a user can start the locking process by selecting Parental Controls from the Setting screen. Existing enabled restrictions will be shown in the list of features, upon successful log in. After exiting the Parental Controls setting, if a user tries to interact with a restricted widget at the home screen, passcode model is prompted. Only with a valid passcode will the user be able to access the widget content. In another embodiment, instead of locking the application, the user is allowed to restrict access to a specific feature of the application. It has been discovered that the lock feature may work as a parental control mechanism to ensure that under aged children will not accidentally access inappropriate content or information.

In one embodiment, a portion of the touch screen may have its interactive feature disabled so that the screen will not respond to user's touch input. For example, through parental control setting, a parent may configure that a music player widget will not be controlled by her kid. When the music player widget is playing a song and the kid tries to change the playback, upon recognition of the kid based on height for example, the portion showing the music player widget becomes not interactive. In another example, upon recognition of the kid, the touch screen may adjust the placements of widgets so that the widgets that are desired to be shown to the kid but not supposed to be changed by the kid may be moved to the lower part of the screen. The lower part is reachable by the kid but is locked so that cannot be modified.

Referring specifically to FIG. 25, a series of screens allowing for the setting of a parental control. A user can first select a parental settings option 2502, where a keypad 2504 is displayed, allowing a user to enter a passcode for access to a parental controls section. In the event of a failed passcode entry, a user may be sent a recovery email to reset the password. Upon returning to the parental controls screen after an initial setup, the user will be prompted to input a passcode to enter the feature. If the user forgets the passcode, the user can select a reset passcode option in response to the selection of a password reset option 2506, where an email will be sent to a primary email address associated with the refrigerator.

Turning now to FIG. 26, another passcode feature of the parental controls application of FIG. 25 is shown. According to the implementation of FIG. 26, a user can select a parental controls option 2602, such as by selecting a box, with an option to return to a previous parental controls screen by selecting a return option 2604. As shown in another implementation of the passcode feature of the parental controls application of FIG. 27, when a parental controls screen 2702 of a home screen 2704 is selected, a keypad 2706 for opening a locked application is presented. Assuming that a correct passcode is entered, the application 2708 is presented.

Figure 28:
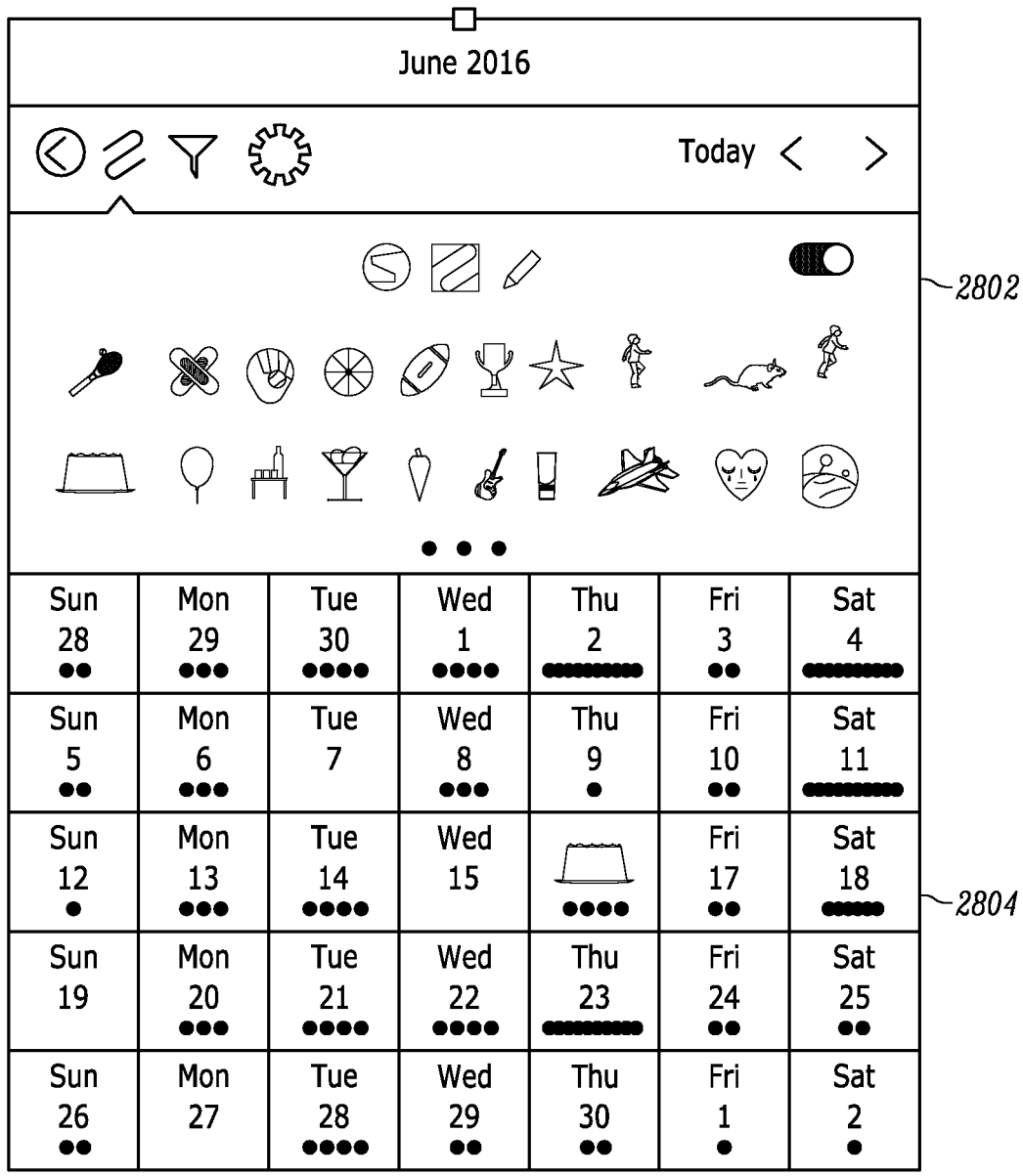
FIG. 28 illustrates an event selection feature of a calendar application.
Figure 29:
FIG. 29 illustrates a mark-up feature of a calendar application.

Turning now to FIG. 28, an event selection feature of a calendar application is shown. A plurality of event or activity icons are provided in an event selection portion 2802 located above a calendar portion 2804. According to another feature, the calendar may be annotated, as shown in FIG. 29. For example, a user could add a picture 2902 to a particular day on the calendar to indicate a birthday or add written text, such as the text entries 2904 and 2906. In one embodiment, users are able to provide analog input such as drawing and/or write directly onto an application UI to make highlight or connotations. For example, Calendar App is usually used by family members to coordinate activities, and analog input on top of the month squares is supported. Thus, a user could instead of or in addition to the events, add their own using an input tool to "doodle" on the calendar.

According to other embodiments, a user may use a finger, a stylus or another input mechanism as the input tool to draw or write directly on touch screen 102. The user may also insert symbols, tables, chart, images (downloaded or online, screenshot, etc.) or art shapes. When the user enter such analog input, the drawings, writings and/or inserts are reflected on top of the application UI. For example, a Birthday cake sticker may be placed onto the day of her child's birthday. A user may highlight dates by circling the dates with different shapes, symbols or images. Entry of such interactions and their association with a specific application are recorded the next time the application is launched, where the same drawing, writing and/or inserts will be displayed in the same way it was previously entered. For example, smart refrigerator and Calendar App will keep track of doodle for each square of the month and store these in a database. In one embodiment, a limit may be imposed to save storage space, where only 1 year of past events may be retained.

Figure 30:
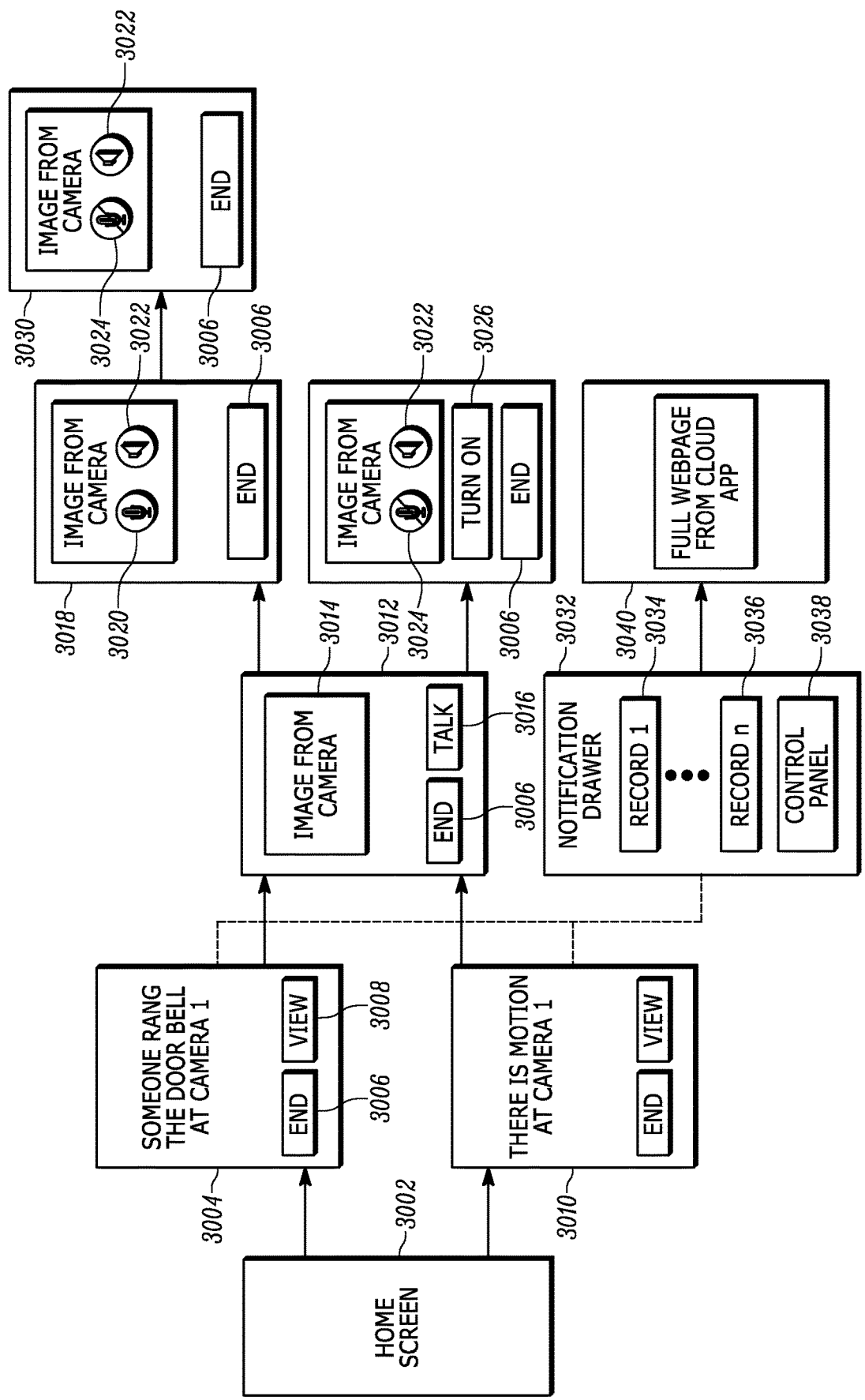
FIG. 30 illustrates an exemplary block diagram of an external camera feature.

Turning now to FIG. 30, an exemplary block diagram of an external camera application, such as a door bell camera or other security camera, is shown. More particularly, FIG. 30 shows stages of the external application which would enable interaction with an individual captured on the camera having a speaker, a microphone, and a motion detector. When initially on a home screen 3002, a trigger at the camera may cause the image captured by the camera to be displayed on the screen. By way of example, the trigger could comprise a ring 3004 of the doorbell for a doorbell camera, where a user would have the option to end 3006 the display of the image or to view 3008 the image. Alternatively, there may be a detection 3010 by a motion detector also resulting in the display of an image. If a user selects the view option, the screen will advance to a two-way communication stage 3012, showing an image 3014 captured by the camera and having an option 3016 to talk to the individual near the camera. If the user elects to talk to the individual, an updated display 3018 will be shown with a microphone 3020 highlighted to indicate that the microphone is on. The user could also select the speaker icon 3022 to enable or disable the speaker. If the user does not elect to activate the microphone, a muted microphone icon 3021 will be shown, where a "turn on" option 3026 would be available. If the user mutes the microphone by selecting the microphone icon from the updated display 3018, the muted microphone icon 3024 would be shown.

If a user ignores the ringing of the doorbell or the motion detected by the camera, the recordings may be saved in a notification drawer 3032, shown here with a plurality of recordings 3034-3036. A control panel 3038 could also enable a user to control the operation and settings associated with storing recorded images. A user could also enter a full web page 3040 from a cloud app to access any of the recorded images.

Figure 31:
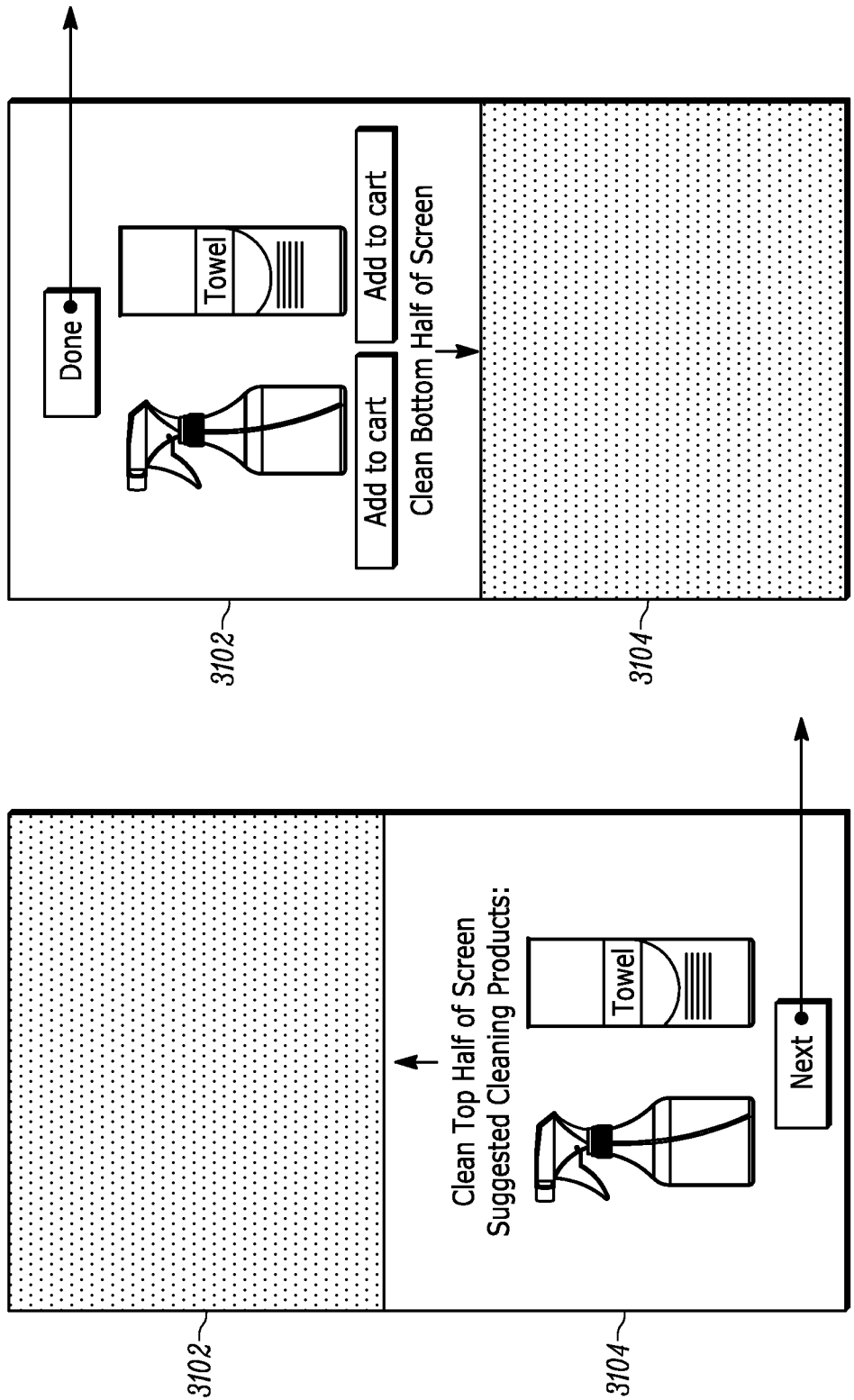
FIG. 31 illustrates a lock-out feature allowing for a cleaning of the screen of a refrigerator storage system.

Turning now to FIG. 31, a lock-out feature allowing for a cleaning of the screen of a refrigerator storage system is shown. A lock-out feature could be selected by a user selecting an icon on the screen for example. When a user selects a lock-out feature to allow cleaning the screen, a first portion 3102 of the screen is inactive (i.e. does not respond to touch screen entries by a user), while a second portion of the screen is active, and allows the first portion to become the active portion and the second portion to become the inactive portion.

According to one embodiment, users can choose to go into a Clean Screen Mode from the setting screen. In the Clean Screen Mode, touch screen 102 of the smart refrigerator changes the display mode so that a portion of touch screen 102 becomes black, allowing smudges and dirt can be easily observed. Another portion of the touch screen 102 is maintained in the normal display mode and provides instructions and information appropriate for touch screen cleaning supplies and methods. Users are able to change the display mode of these portions to complete cleaning the touch screen 102. Users are given the options to purchase cleaning supplies displayed. When users select such options, applicable application is activated to help users complete the transactions, and the display UI switches from Clean Screen Mode to the activated application UI.

According to other embodiments, a smart refrigerator can be configured to give a user briefing in the morning, based on user profile. In one embodiment, user profile also stores voice identification of a user. With the voice identification, the smart refrigerator is capable of determining a corresponding user profile upon a receipt of a voice input. In one embodiment, user profile further records morning brief setting. For example, user profile can save what information the user would like to receive every morning as a morning brief setting. The user preference can be tracked based on past user interactions, or based on the user's explicit choices. The morning brief setting can also take a factory default.

In one embodiment, a user can input a voice command to smart refrigerator such as "Refrigerator, please give me the morning brief." Upon recognition of the voice input, the smart refrigerator processes the voice input to determine a voice identification, thus find a user profile associated with the user. Based on information stored in the user profile, the touch screen 102 may first display weather information for the date based on data provided by a weather application. The weather information may be displayed using home screen Express Access UI of the weather application, or may be displayed through a different UI using data provided by the weather application. Upon locating of a home address and work address from the user profile, a determination that it is a weekday and the user does not mark this day as a vacation day from the Calendar App, the smart refrigerator may cause the touch screen 102 to display a driving map with traffic conditions with starting point as home address and ending point using the work address. Smart refrigerator may further cause touch screen 102 to display a first event relevant to the recognized user based on Calendar App. Other information, such as news, "ToDo" tasks, food reminders, etc., may be displayed based on morning brief setting saved in user profile.

In one embodiment, a user may be allowed to retrieve a consolidated morning brief presented based on multiple user profiles. Morning brief may present information for one user first, then information for the next user. Morning brief may combine information for the same category from multiple users.

In one embodiment, a user can change the information presented by interrupting Morning Brief with voice commands such as "skip weather" or "go to news." Interrupted information may be moved to be presented at the end of morning brief, or may be completely skipped.

In one embodiment, all information included in the morning brief is displayed simultaneously. In one embodiment, information included in the morning brief is displayed in turns of applications. In one embodiment, information from one application phases out and becomes illegible after being display for a period while the home screen Express Access UI from the application remains, and information from another application phases in using home screen Express Access UI from the other application at a different location on touch screen 102.

It has been discovered that morning brief provides the most relevant information to a user for the day that the user is aware of upcoming events and is able to adjust scheduled events accordingly. For example, knowing that traffic to work gets significantly worse due to an accident, the user may determine to work from home for the day, or leave for work sometime later to avoid the congestion. The user may decide to go directly for an appointment instead of going to the office first, then leaving for the appointment, if a user becomes aware that the first appointment of the day is close to the time for usually arriving at the office.

According to other embodiments, the smart refrigerator may support simultaneous multiple display modes of touch screen 102. Touch screen 102 may divide the display areas and each area assumes a display mode distinctive from the other. For example, one area may be in full color display mode, one area may be in black and white display mode, and another may be in low power mode that only a minimum amount of pixels are on.

Figure 32:
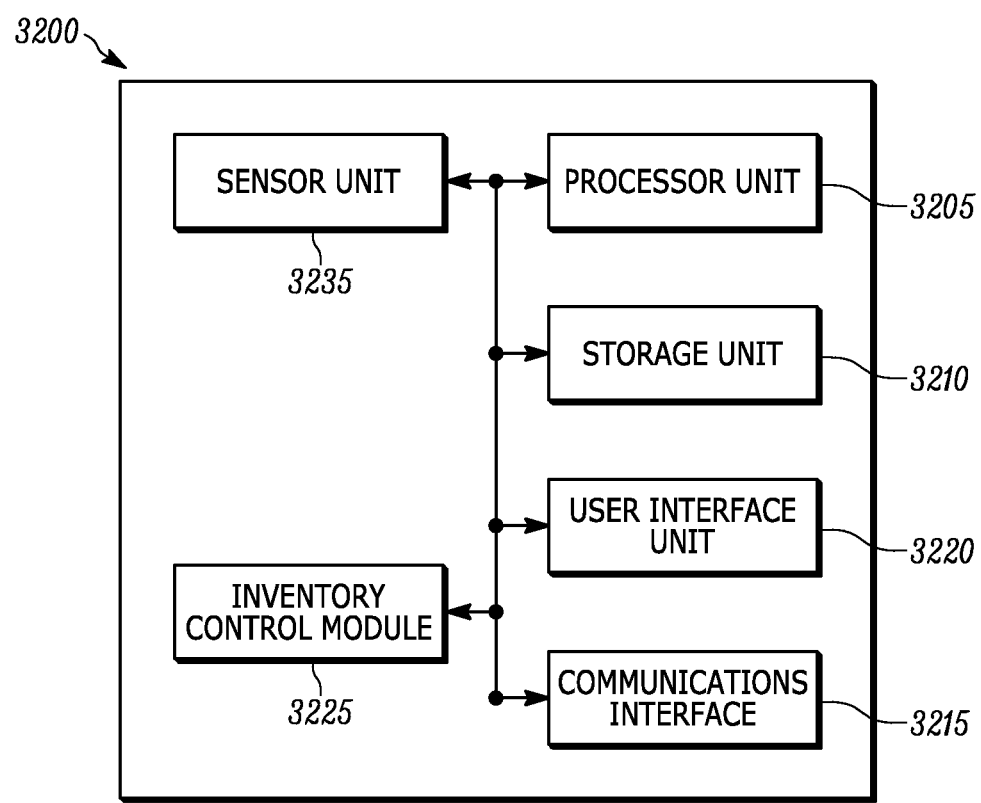
FIG. 32 illustrates an exemplary block diagram of refrigerator storage system.

Turning now to FIG. 32, an exemplary block diagram of refrigerator storage system is shown. The storage structure 3200, which may be any types of storage structures (e.g., a smart refrigerator described in this application), includes a processor unit 3205 including one or more processors, a storage unit 3210, a user interface unit 3220, a communications interface 3215, sensor unit 3235, and an inventory control module 3225. The storage structure 3200 may be any structure or device that are arranged to hold objects, including but not limited to a refrigerator, a cabinet, a storage container, a warehouse, etc.

The storage unit 3210 is any hardware suitable for storing data or executable computer code. The storage unit 3210 can include but is not limited to a hard drive, flash drive, non-volatile memory, volatile memory or any other type of computer readable storage medium. Any operation or method for a storage structure or refrigerator that is described in this application (e.g., user profile) may be stored in the form of executable computer code or instructions in the storage unit 3210. The execution of the computer code or instructions by the processor unit 3205 causes the storage structure 3200 or a suitable device coupled with the storage structure to perform any of the aforementioned operations or methods.

The communications interface 3215 includes any hardware or software suitable for enabling the storage structure 3200 to communicate with external devices. The communications interface 3215 further includes any hardware or software suitable for enabling the different units of structure 3200 to communicate with each other. In some embodiments, for example, the storage structure 3200 communicates messages and information to an external device (e.g., a smartphone, smart glasses, smartwatch, etc.) for display. Additionally, the storage structure 3200 may transmit images and sensors data to an external device (e.g., a server) so that some or all of the processing of data occurs at the external device. Any information obtained using the techniques described herein may be transmitted to an external device/server using the communications interface 3215, so that it may be accessed by other devices. The communications interface unit 3215 may be arranged to transmit data and receive data using any suitable network (e.g., LAN, Internet, etc.) or communications protocol (e.g., Bluetooth, WiFi, NFC, IEEE 802.15.4, IEEE 802.11, etc.)

The sensor unit 3235 includes one or more cameras, microphone, speaker, or other sensing/monitoring devices that may be positioned at, near, on and/or inside the storage structure. The sensor unit 3105 may also include any sensors for monitoring the quality, quantity, condition, or state of food stored in the refrigerator. The sensors are arranged to be operated using any technique described herein.

The inventory control module 3225 may be any hardware or software that is used to perform operations related to the monitoring or updating of inventory in the storage structure 3200. The module 3225 may be arranged to perform or coordinate any operation that relates to the collection and analysis of sensor data, the identification of objects and update of inventory.

The user interface unit 3220 may be any hardware (e.g., touch screen 102) or software arranged to display and accept information. Any suitable display technology may be used to display information e.g., a touch sensitive (capacitive) screen, an e-ink display, an LCD or OLED display, etc. The storage structure 3200 may display any kind of message or information described herein at the user interface unit 3220 (e.g., morning brief, etc.). It should be noted that in various implementations, any of the above information may also be conveyed to the user via audio statements from a speaker coupled with the storage structure 3200. In still other embodiments, the storage structure 3200 may be arranged to transmit any such messages or information via a wired or wireless network to an external device (e.g., smart watch, smartphone, computer glasses, laptop, computer, etc.) for display. In yet other embodiments, the user interface unit 3220 can receive user input and transmit such input to the storage unit 3210 for further processing. The user interface unit 3220 may work with coupled microphone, wireless keyboard, or other input device to receive various format of data input.

Information transferred via communications interface 3215 may be in the form of signals such as electronic, electromagnetic, optical, or other signals capable of being received by communications interface, via a communication link that carries signals and may be implemented using wire or cable, fiber optics, a phone line, a cellular phone link, an radio frequency (RF) link, and/or other communication channels.

Figure 33:
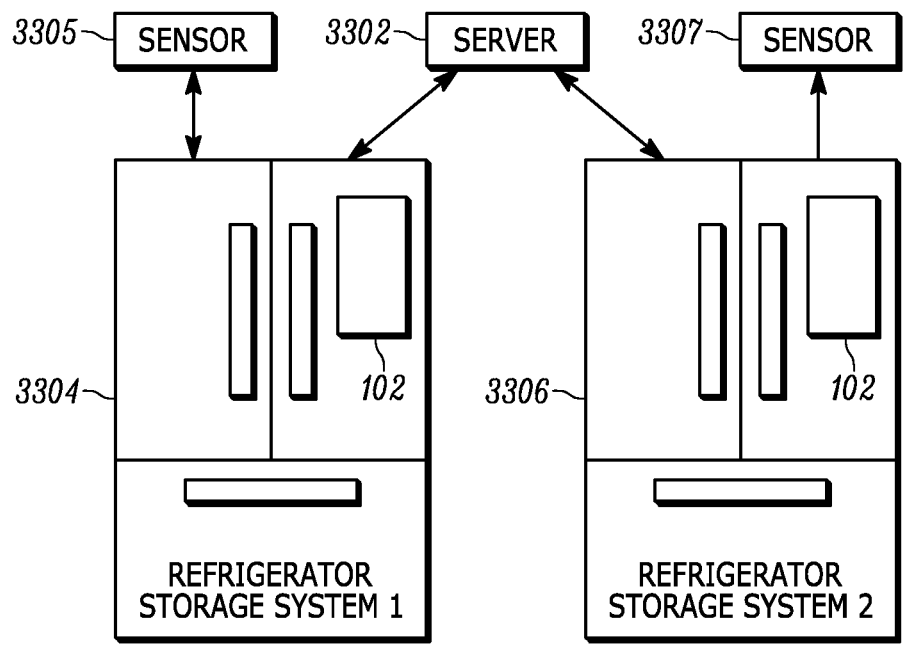
FIG. 33 illustrates an exemplary block diagram of system having a plurality of refrigerator storage systems.

Turning now to FIG. 33, an exemplary block diagram of system having a plurality of refrigerator storage systems is shown. A remote server 3302 is configured to communicate with a plurality of refrigerator storage systems, including a first refrigerator storage system 3304 (having an external sensor 3305) and a second refrigerator storage system 3306 (having an external sensor 3307) by way of a communication link, which may be a wireless or wired communication link. Each refrigerator storage systems may be implemented as described in reference to FIGS. 1-31. The external sensor is coupled to a refrigerator storage system by any type of wired or wireless connection, and can comprise any sensor that provides information to the refrigerator storage system that could be displayed or used to generate data or information that could be displayed on the display 102. By way of example, the external sensors 3305 and 3307 could be a camera, such as a doorbell camera or other security camera, as described in reference to FIG. 30.

In one embodiment of a system having a plurality of refrigerator storage systems, when user B comes to user A's home for a visit, user A's smart refrigerator system will try to determine user B's identification. Upon failure of matching user B's information to the data stored in any one of the user profile accessible by user A's smart refrigerator system, user A's smart refrigerator system will contact the central controlling system for user B's identification. If the central controlling system has a copy of user B's user profile, it will send user B's preference data to user A's smart refrigerator system so that user A's smart refrigerator system is able to present a home screen, widgets and applications in a manner desired by user B. In another embodiment, user B can specify private data and public data when setting up a user profile that only public data will be provided in the private mode (i.e. such as when displayed on a user as smart refrigerator system). For example, a recipe can be displayed for user B. However, a family secret ingredient that has been identified as private data will not be shown when user A's smart refrigerator shows information in the private mode to user B.

In another embodiment, every smart refrigerator system is registered with a central controlling system, such as server 3302. The central controlling system thus stores a copy of every user profile. The central controlling system and individual smart refrigerator system may be synchronized. Each user profile may further include designation of data as public and private data, and how it is associated with the public and private mode. For example, a user can configure a subset of content to be presented when the smart refrigerator system is in a private mode for that user.

Figure 34:
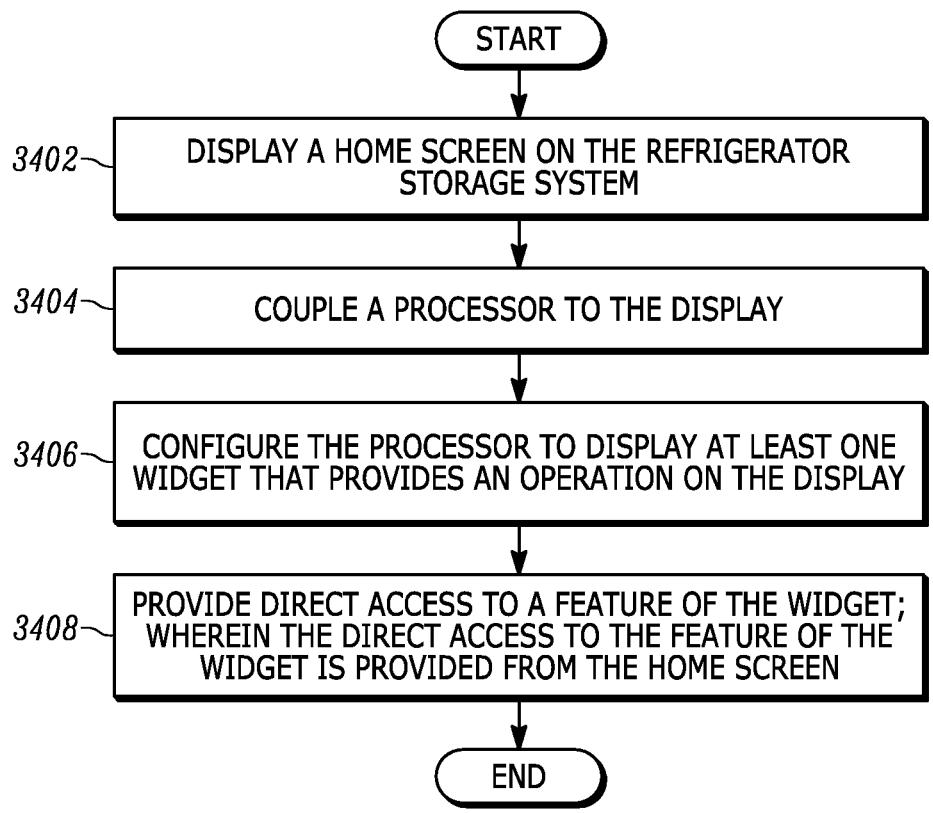
FIG. 34 is a flow diagram illustrating a method of implementing widgets providing direct access to a feature of the widget of a refrigerator storage system.
Figure 35:
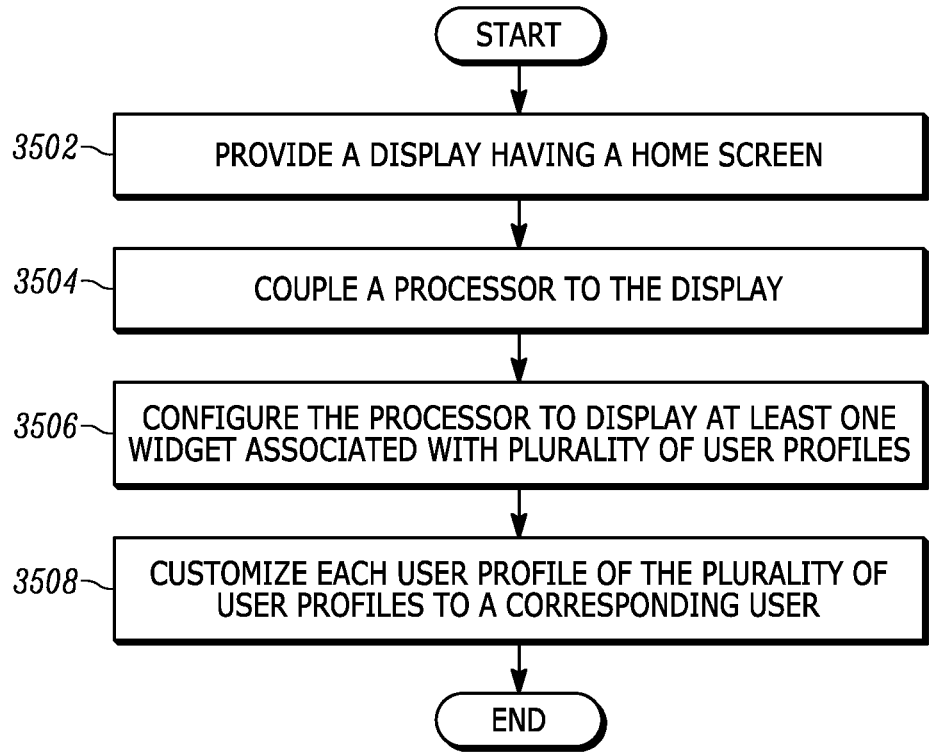
FIG. 35 is a flow diagram illustrating a method of implementing a plurality of user profiles associated with widgets of a refrigerator storage system.
Figure 36:
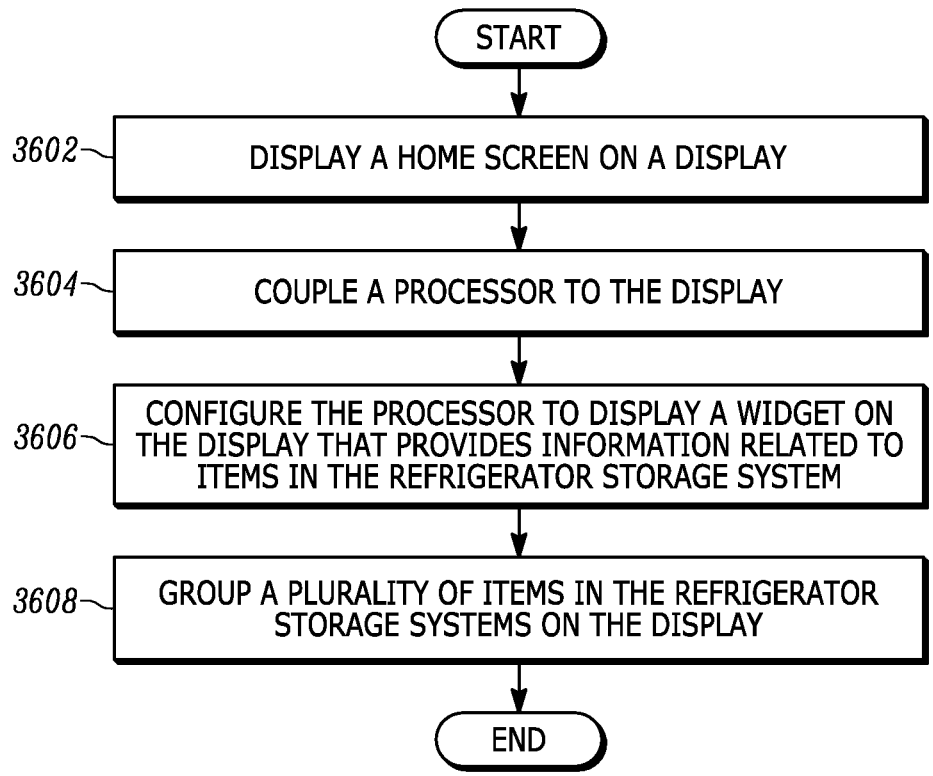
FIG. 36 is a flow diagram illustrating a method of providing information related to items in a refrigerator storage system.

FIGS. 34-36 describe methods that can be implemented using the smart refrigerator systems described in FIGS. 1-33. Turning first to FIG. 34, a flow diagram illustrating a method of implementing widgets providing direct access to a feature of the widget of a refrigerator storage system is shown. According to the method of FIG. 34, a home screen is displayed on a display of the refrigerator storage system at a block 3402. A processor is coupled to the display at a block 3404. At least one widget that provides an operation is displayed on the display, wherein the at least one widget comprises an interface portion providing direct access to a feature of the widget at a block 3406. The direct access to the feature of the widget may be provided from the home screen at a block 3408.

The method may further comprise providing a link to a specific page of an application associated with the widget using a user-selectable area of the widget, and controlling navigation between pages of the application associated with the widget in response to gestures. The method may also comprise implementing a launch icon to launch the widget to a full scale. Further, a direct access to a feature of the widget may be specific to a user based upon a user profile. The method may further comprise implementing a sensor for determining an identity of the user, wherein the interface portion providing direct access to the feature of the widget is provided based upon the identity of the user.

Turning now to FIG. 35, a flow diagram illustrating a method of implementing a plurality of user profiles associated with a widgets of a refrigerator storage system is shown. Another embodiment of implementing a refrigerator storage system may comprise displaying a home screen on a display of the refrigerator storage system at a block 3502. A processor may be coupled to the display at a block 3404, where the processor may be configured to display at least one widget associated with plurality of user profiles at a block 3506. Each user profile of the plurality of user profiles may be customized to a corresponding user at a block 3508.

The method may further comprise identifying each user profile of the plurality of user profiles by at least one of a color code, a screen name, or an avatar, wherein a group of user profiles may be identified by at least one of the color code, the screen name, or the avatar. Content may be provided in response to the selection of the widget is filtered for each user profile of the plurality of user profiles, wherein the filtering of content may be provided in response to the selection of the widget is based upon a parental control setting. The method may further comprise coupling a communication circuit to the processor, wherein the communication circuit is configured to access a remote device to access information displayed on the display. The communication circuit may provide access to information associated with a user profile of a second refrigerator storage system.

Turning now to FIG. 36, a flow diagram illustrating a method of providing information related to items in a refrigerator storage system is shown. Another method of implementing a refrigerator storage system may comprise displaying a home screen on a display of the refrigerator storage system at a block 3602, and coupling a processor to the display at a block 3604. The processor may be configured to display a widget on the display that provides information related to items in the refrigerator storage system at a block 3606 and group a plurality of items in the refrigerator storage systems on the display at a block 3608.

According to other aspects of the method, the grouping of the plurality of items may be adjusted in response to a gesture of the user. The display may comprise a touch screen display, where gesture may be used to create a bounding object identifying the plurality of items. The processor may be further configured to add the plurality of items to a food list, or to identify a recipe using the plurality of items. The processor may further receive sensor information associated with the plurality of items in the refrigerator storage system, where at the least one widget may be displayed with the plurality of items.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

It should be noted that the illustrated regions of the figures are merely examples. Also, it should be noted that although the above illustrations are shown in two dimensions, the zones are often three dimensional. It also should be noted that for clarity and ease of illustration, the figures are not necessarily made to scale.

While the above detailed diagrams have shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention.

Though embodiments have been described with reference to certain versions thereof; however, other versions are possible. Therefore, the spirit and scope of the embodiments should not be limited to the description of the preferred versions contained herein.

It can therefore be appreciated that new devices for and methods of implementing a refrigerator storage device have been described. It will be appreciated by those skilled in the art that numerous alternatives and equivalents will be seen to exist that incorporate the disclosed invention. As a result, the invention is not to be limited by the foregoing embodiments, but only by the following claims.

We claim:

1. A refrigerator storage system comprising:
   a display having a home screen;
   a camera configured to allow a view of inside the refrigerator storage system and to capture an image of items stored inside the refrigerator storage system;
   a processor coupled to the display and the camera, the processor configured to:
   display the image of the items on the display;
   provide a bounding object on the display;
   move the bounding object from a first position to a second position to overlay at least one of the items on the display, wherein the items on the display remain unchanged on the display when the bounding object is moved;
   change a size of the bounding object to group a plurality of the items in the refrigerator storage system in the bounding object on the display, wherein the group of items shown in the bounding object, after the size of the bounding object is changed, remains unchanged on the display; and
   display one or more icons with the bounding object, wherein an icon of the one or more icons can be selected to enter information associated with the plurality of items in the bounding object.

2. The refrigerator storage system of claim 1 wherein the grouping of the plurality of the items is adjusted in response to a gesture of a user.

3. The refrigerator storage system of claim 2 wherein the display comprises a touch screen display, and the gesture creates the bounding object identifying the plurality of the items.

4. The refrigerator storage system of claim 1 wherein the processor is further configured to add the plurality of the items to a food list.

5. The refrigerator storage system of claim 1 wherein the processor is further configured to identify a recipe using the plurality of the items.

6. The refrigerator storage system of claim 1 wherein the processor further receives sensor information associated with the plurality of the items in the refrigerator storage system.

7. The refrigerator storage system of claim 1 wherein displaying the one or more icons with the bounding object comprises displaying one or more application icons with the bounding object on the display.

8. The refrigerator storage system of claim 1 wherein the bounding object is movable to overlay any part of the image.

9. The refrigerator storage system of claim 1 wherein the size of the bounding object is changed in response to a gesture.

10. The refrigerator storage system of claim 1 wherein the size of the bounding object is determined by user preferences.

11. The refrigerator storage system of claim 1 wherein a widget provides a link to a page of an application associated with the widget.

12. The refrigerator storage system of claim 11 wherein the widget is responsive to gestures for controlling navigation between pages of the application associated with the widget.

13. The refrigerator storage system of claim 1 further comprising a communication circuit coupled to the processor, wherein the communication circuit is configured to access a remote device to provide access to the information displayed on the display.

14. A method of implementing a refrigerator storage system, the method comprising:
   providing a display on the refrigerator storage system and having a home screen;
   providing a camera configured to view inside the refrigerator storage system and to capture an image of items stored inside the refrigerator storage system;
   displaying the image of the items in the refrigerator storage system, captured by the camera, on the display;
   providing a bounding object on the display;
   wherein the bounding object is movable from a first position to a second position to overlay at least one of the items on the display, wherein the items on the display remain unchanged on the display when the bounding object is moved;
   wherein a size of the bounding object is adjustable to group a plurality of the items in the refrigerator storage system in the bounding object on the display, and the group of items shown in the bounding object, after the size of the bounding object is changed, remains unchanged on the display; and displaying one or more icons with the bounding object, wherein an icon of the one or more icons can be selected to enter information associated with the plurality of items in the bounding object.

15. The method of claim 14 further comprising adjusting the grouping of the plurality of the items in response to a gesture of a user.

16. The method of claim 15 wherein the display comprises a touch screen display, the method further comprising creating the bounding object identifying the plurality of the items in response to the gesture.

17. The method of claim 14 further comprising configuring a processor to add the plurality of the items to a food list.

18. The method of claim 14 further comprising configuring a processor to identify a recipe using the plurality of the items.

19. The method of claim 14 further comprising configuring a processor to receive sensor information associated with the plurality of the items in the refrigerator storage system.

20. The method of claim 14 wherein displaying the one or more icons with the bounding object comprises displaying one or more application icons with the bounding object on the display.

21. The method of claim 14 further comprising enabling moving the bounding object to overlay any part of the image.

22. The method of claim 14 further comprising enabling changing the size of the bounding object in response to a gesture.

23. The method of claim 14 further comprising determining the size of the bounding object by user preferences.

24. The method of claim 14 wherein a widget provides a link to a page of an application associated with the widget.

25. The method of claim 24 wherein the widget is responsive to gestures for controlling navigation between pages of the application associated with the widget.

26. The method of claim 14 further comprising coupling a communication circuit to a processor, wherein the communication circuit is configured to access a remote device to provide access to the information displayed on the display.

* * * * *